US012631469B2

(12) United States Patent
Sheng et al.

(10) Patent No.: US 12,631,469 B2
(45) Date of Patent: May 19, 2026

(54) MACHINE LOCALIZATION

(71) Applicant: NVIDIA Corporation, Santa Clara, CA (US)

(72) Inventors: Yu Sheng, San Deigo, CA (US); Amir Akbarzadeh, Alamo, CA (US); Vishisht Gupta, Santa Clara, CA (US); Jordan Marr, Campbell, CA (US); Shaun Liu, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 310 days.

(21) Appl. No.: 18/493,984

(22) Filed: Oct. 25, 2023

(65) Prior Publication Data

US 2025/0137813 A1 May 1, 2025

(51) Int. Cl.
| | |
|---|---|
| *G06K 9/00* | (2022.01) |
| *G01C 21/00* | (2006.01) |
| *G01C 21/34* | (2006.01) |
| *G06T 7/536* | (2017.01) |
| *G06T 7/73* | (2017.01) |
| *G06V 20/56* | (2022.01) |

(52) U.S. Cl.
CPC ..... *G01C 21/3848* (2020.08); *G01C 21/3453* (2013.01); *G06T 7/536* (2017.01); *G06T 7/75* (2017.01); *G06V 20/56* (2022.01)

(58) Field of Classification Search
CPC ............ G01C 21/3848; G01C 21/3453; G01C 21/3602; G01C 21/30; G01C 21/005;

G06T 7/536; G06T 7/75; G06T 2207/10016; G06T 2207/20081; G06T 2207/20084; G06T 2207/30244; G06T 2207/30256; G06T 7/73; G06V 20/56
See application file for complete search history.

(56) References Cited

U.S. PATENT DOCUMENTS

| | | | | |
|---|---|---|---|---|
| 11,462,023 | B2 * | 10/2022 | Kehl | G06V 20/64 |
| 11,472,442 | B2 * | 10/2022 | Duan | G01C 21/3815 |
| 11,494,937 | B2 * | 11/2022 | Urtasun | G01S 17/86 |
| 11,713,978 | B2 * | 8/2023 | Akbarzadeh | G01C 21/3841 |
| | | | | 701/409 |
| 12,014,520 | B2 * | 6/2024 | Liu | G06V 10/82 |
| 12,223,677 | B1 * | 2/2025 | Foucard | B60W 60/001 |
| 12,293,543 | B1 * | 5/2025 | Wang | G06T 7/50 |

(Continued)

*Primary Examiner* — Shervin K Nakhjavan
(74) *Attorney, Agent, or Firm* — Sanders IP Law

(57) ABSTRACT

Embodiments of the present disclosure relate to a system and method used to localize one or more systems using 2D map data. The method may include determining an image location of a representation of a portion of an object in an image corresponding to an environment. In some embodiments, the method may additionally include determining one or more predicted image locations corresponding to the image location of the representation of the portion of the object. The method may additionally include comparing one or more ground plane locations of the portion of the object with the one or more predicted image locations, and determining a cost based at least on the comparison between the one or more ground plane locations and the one or more predicted image locations. Further, the method may include localizing a system to the 2D map data based on the determined cost.

17 Claims, 14 Drawing Sheets

(56)     References Cited

U.S. PATENT DOCUMENTS

| | | | |
|---|---|---|---|
| 2021/0150230 A1* | 5/2021 | Smolyanskiy | G06V 10/803 |
| 2023/0176216 A1* | 6/2023 | Desai | G01C 21/12 |
| | | | 356/5.01 |
| 2023/0245469 A1* | 8/2023 | Holicki | B60W 30/0956 |
| | | | 382/103 |
| 2024/0230335 A1* | 7/2024 | Roumeliotis | G07C 5/08 |
| 2025/0014200 A1* | 1/2025 | Ahmed | G06V 20/56 |

* cited by examiner

Image Sensor
102

Image Data
106

Localization System
104

2D Map Data
108

Localization Data
110

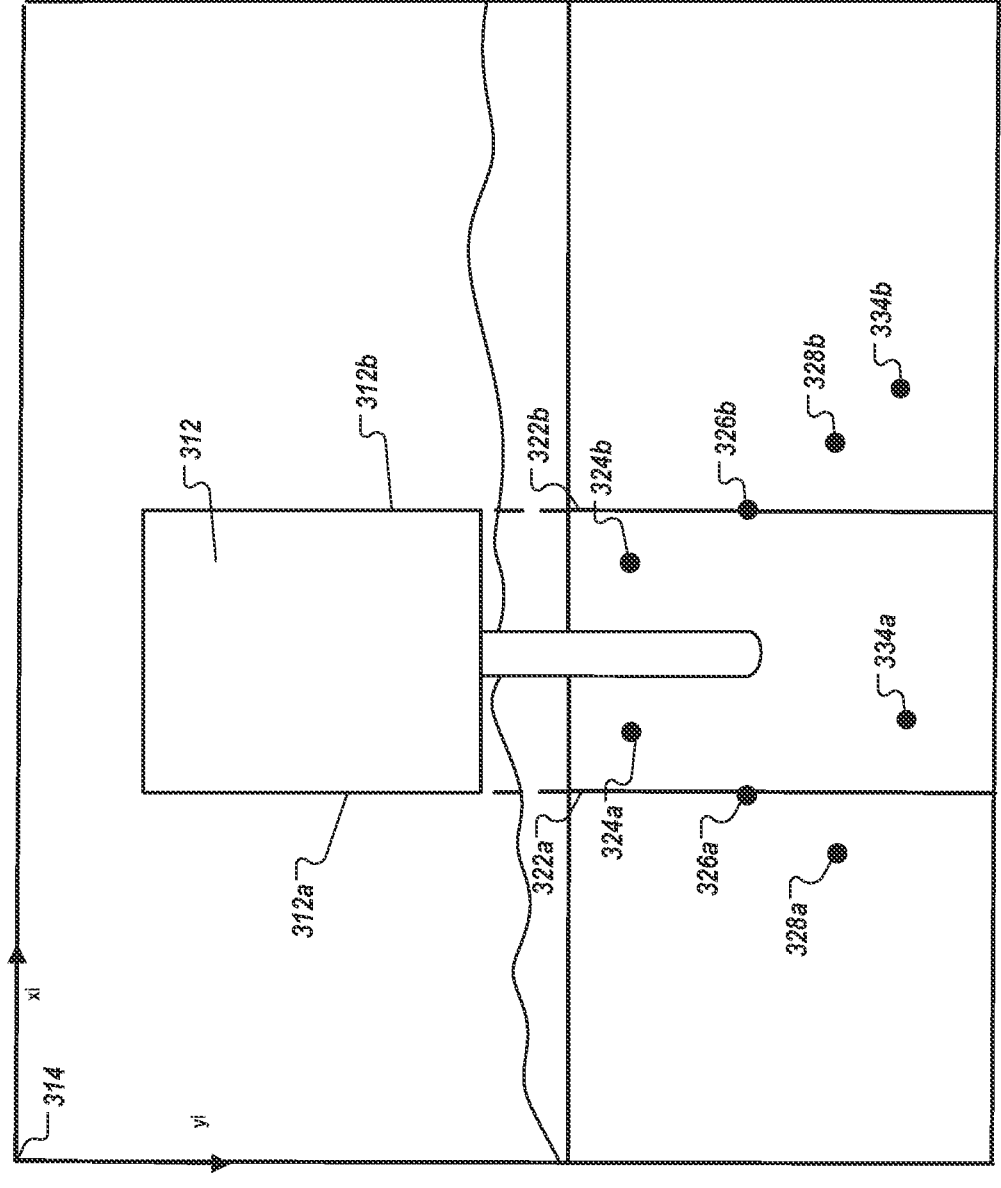
FIG. 3

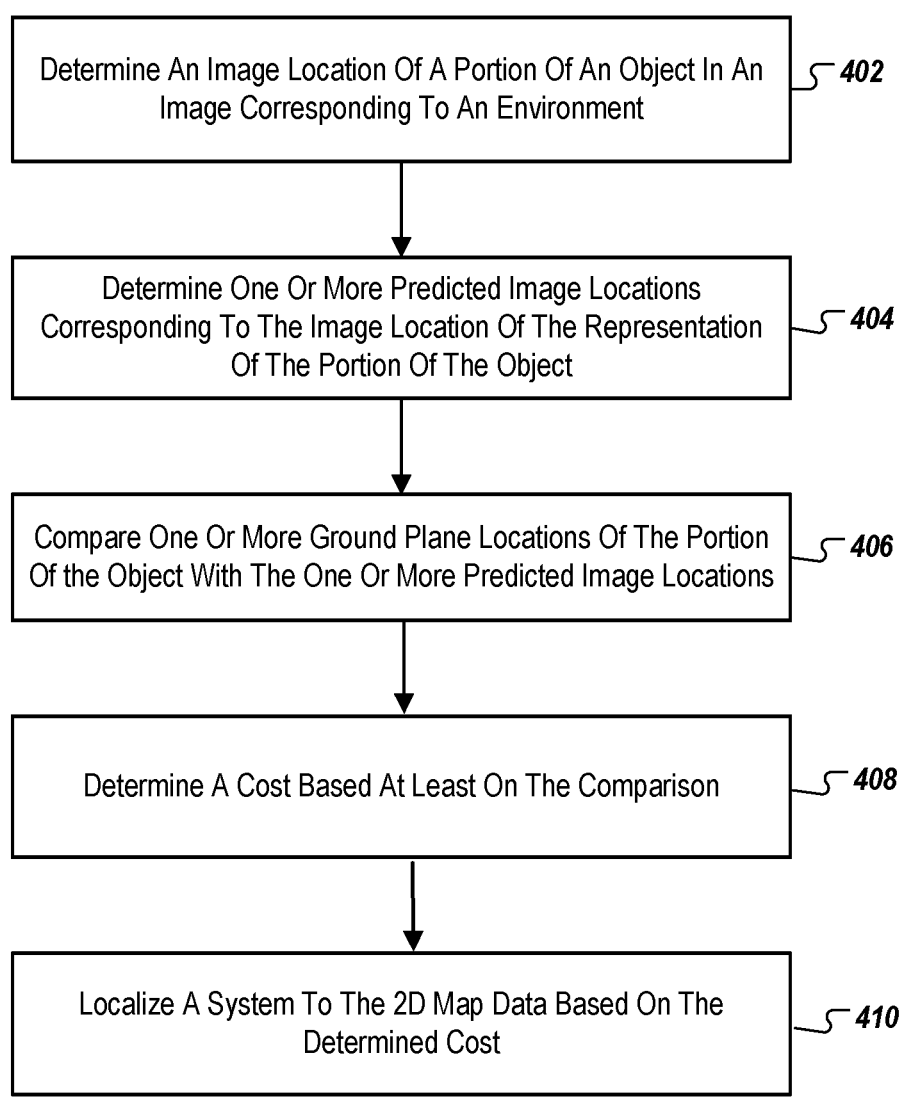

400

| | |
|---|---|
| Determine An Image Location Of A Portion Of An Object In An Image Corresponding To An Environment | 402 |
| Determine One Or More Predicted Image Locations Corresponding To The Image Location Of The Representation Of The Portion Of The Object | 404 |
| Compare One Or More Ground Plane Locations Of The Portion Of the Object With The One Or More Predicted Image Locations | 406 |
| Determine A Cost Based At Least On The Comparison | 408 |
| Localize A System To The 2D Map Data Based On The Determined Cost | 410 |

*FIG. 4*

Stereo Camera 568

Mid-Range Camera, Wing Mirror Mount 598

Surround Camera 574

Surround Camera(s) 574

Surround Camera(s) 574

Infrared Camera 572

Wide View Camera 570

Long-Range Camera 598

Long-Range Camera 598

Stereo Camera 568

500

700
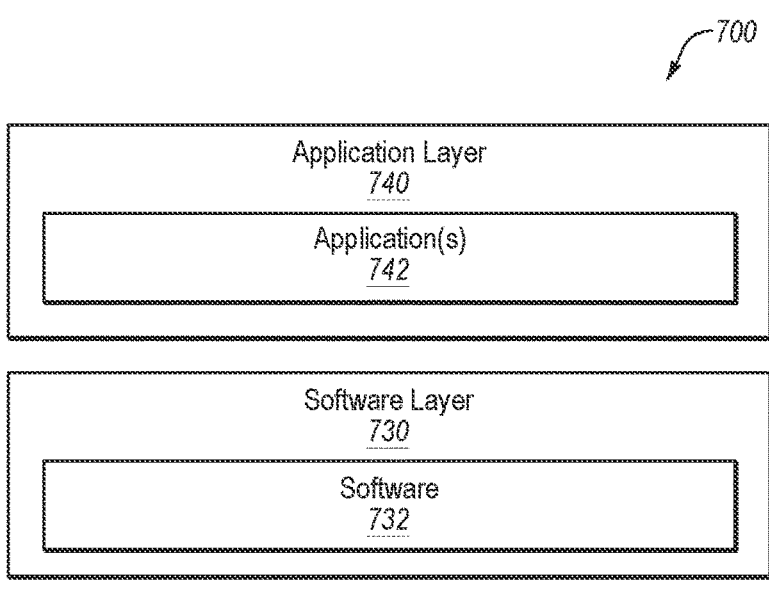
Application Layer
740
Application(s)
742
Software Layer
730
Software
732
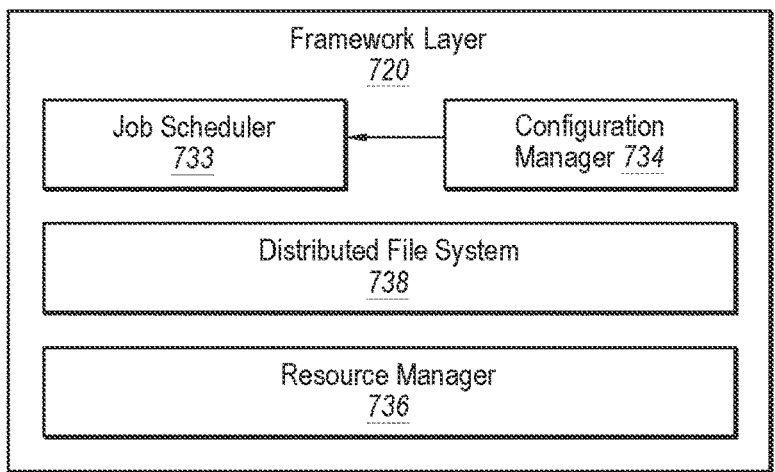
Framework Layer
720
Job Scheduler
733
Configuration
Manager 734
Distributed File System
738
Resource Manager
736
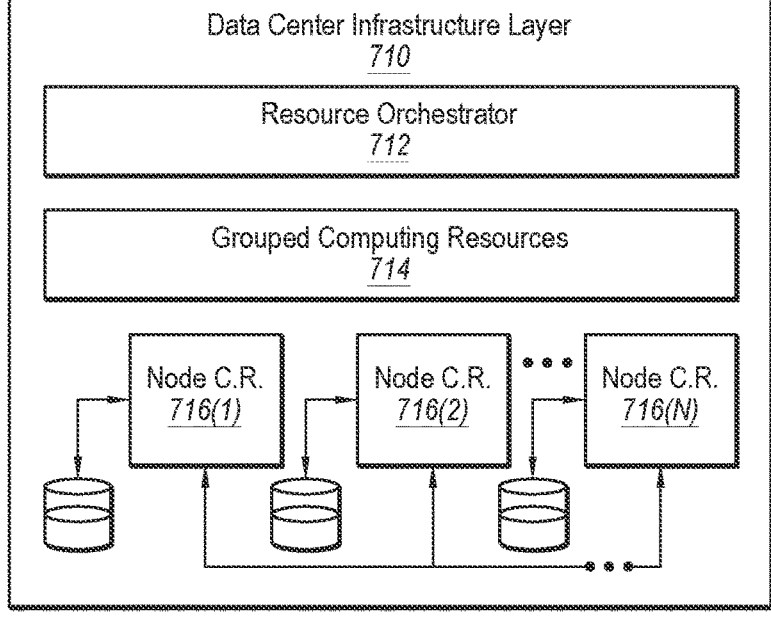
Data Center Infrastructure Layer
710
Resource Orchestrator
712
Grouped Computing Resources
714
Node C.R.
716(1)
Node C.R.
716(2)
Node C.R.
716(N)
*FIG. 7*

MACHINE LOCALIZATION

BACKGROUND

Mapping, localization, and navigation are important processes for many machines and, in particular, for autonomous and semi-autonomous machines (e.g., ego-machines). Map data corresponding to a map, sensor perception, or a combination thereof is often used to localize an ego-machine with respect to the map in order to make planning and control decisions. In some instances, localization processes associated with ego-machines may be performed using sensor data generated using one or more sensors and map data corresponding to a map of an area associated with an environment in which the ego-machine may be located. The one or more localization processes may compare the sensor data generated using the one or more sensors and the map data corresponding to the map. Further, the localization processes may update the pose corresponding to the ego-machine based on the comparison between the sensor data and the map data corresponding to the map of the environment.

In a typical deployment scenario, map data corresponding to the map of the environment may include three-dimensional (3D) map data. Correspondingly, localization processing may include one or more processes by which one or more poses corresponding to the ego-machine may be determined in the environment. However, in some instances, 3D map data may not be available or feasible for use in the ego-machine. For example, map data corresponding to a map of an environment in China may only be two-dimensional (2D) due to regulations limiting what data may be collected and used by, for example, ego-machines. As an additional example, 3D map data may include more map data than may be processed using one or more systems of the ego-machine and/or one or more other systems corresponding to the ego-machine. As a result, using 3D map data may not be possible or may be prohibitively expensive.

To remedy these concerns and/or potential issues with localization, 2D data may be used in one or more localization processes which may be used despite regulations, processing availability, and/or other constraints associated with the ego-machine. For example, one or more traditional localization techniques using 2D data may use multiple cameras generating image data corresponding to multiple fields of view over multiple corresponding timestamps. Continuing the example, because the one or more traditional localization techniques include multiple cameras and multiple timestamps, the localization determination may additionally include triangulation of particular feature poses corresponding to objects over time. Triangulating feature poses over time may be performed to build a map of a corresponding environment; for example, using one or more localization and mapping techniques, e.g., simultaneous localization and mapping (SLAM). One example limitation of these traditional techniques is that any error associated with the triangulation of particular feature poses may affect the localization result. Further, in many instances, the errors corresponding to triangulation of feature poses over time may propagate thereby compounding errors corresponding to the accuracy of the localization determinations over time. The propagation of errors over time may render the localization processes ineffective, inaccurate, and/or unusable.

SUMMARY

According to one or more embodiments of the present disclosure, an image location of a portion of an object in an image may be determined, where the image may correspond to a particular environment. In some embodiments, the image location may be defined in a 2D image space based on image data corresponding to the image (e.g., image data generated using a camera). In some embodiments, one or more predicted image locations corresponding to the image location of the representation of the object may be determined based on one or more different considerations. The considerations including, for example, a representation of the ground in a real-world environment; a vanishing point that may be projected into the image space, and/or the image location of the representation of the portion of the object. In some embodiments, ground plane locations of the portion of the object may be compared with the predicted image locations. The ground plane locations may be determined using a 2D map of the environment projected onto the 2D image space. Additionally or alternatively, a cost may be determined based on the comparison between the ground plane locations and the predicted image locations. Further, in some embodiments, a system may be localized based on the determined cost.

Embodiments of the present disclosure may allow for localization without the errors corresponding to triangulating feature poses corresponding to one or more objects over time. By determining one or more predicted image locations corresponding to a portion of an object and comparing the one or more predicted image locations to one or more ground plane locations determined using a 2D map projected in the 2D image space, one or more localization determinations may be performed more accurately and using less data as compared to one or more of the traditional localization techniques.

BRIEF DESCRIPTION OF THE DRAWINGS

The present systems and methods for navigating using 2D map data for autonomous or semi-autonomous machines are described in detail below with reference to the attached figures, wherein:

FIG. 3 illustrates an example diagram representing a cost comparison between one or more predicted image locations and one or more sets of projected 2D map data corresponding to respective points of interest associated with an object, in accordance with one or more embodiments of the present disclosure;

FIG. 4 is a flow diagram showing a method for localizing systems using 2D map data, in accordance with one or more embodiments of the present disclosure;

FIG. 7 is a block diagram of an example data center suitable for use in implementing one or more embodiments of the present disclosure.

DETAILED DESCRIPTION

Figure 1A:
FIG. 1A illustrates a flow diagram for a process of localization, in accordance with one or more embodiments of the present disclosure.

One or more of the embodiments disclosed herein may relate to one or more processes for localizing one or more systems, including autonomous and/or semi-autonomous systems (e.g., one or more ego-machines), using 2D map data, where the 2D map data may correspond to an environment in which one or more ego-machines may be located. Reference to mapping and localization processes, in the present disclosure, may refer to a process by which a pose (e.g., a location and/or an orientation) corresponding to the ego-machine and/or a sensor corresponding to the ego-machine may be determined. In some embodiments, the sensor data corresponding to the ego-machine may be generated using one or more image sensors (e.g., cameras) that may be configured to generate one or more images corresponding to the environment within which the ego-machine may be located. In some embodiments, the image data corresponding to the environment may include a 2D representation of one or more objects corresponding to the environment. The one or more objects may include one or more objects in the environment that may be included in the map data, such as, for example, one or more street signs, poles (telephone poles, electricity poles, etc.), streetlights, trees, medians, fences, ramps, and other objects that may be included in the map data corresponding to the map of the environment.

In some embodiments, the image data corresponding to a particular image may correspond to a particular image space. The particular image space may include a mathematical representation used to represent and/or organize data in a 2D environment. In some embodiments, the particular image space may be defined using a particular coordinate system using two spatial dimensions. Additionally or alternatively, the image space may be bound by the particular image.

In some embodiments, the particular image corresponding to the image space may include a representation of one or more objects corresponding to the environment. Further, the particular image corresponding to the image space may include a representation of the "ground," which may include a representation of the ground in the real-world.

In some embodiments, the map corresponding to the map data may be a 2D representation of the environment that may be generated using the map data. The environment may correspond to a location at which the ego-machine and/or the image sensor may be located. For example, the 2D map data may correspond to one or more objects, locations, streets, etc. without data and/or information corresponding to the height of the one or more objects.

In some embodiments, the map data corresponding to the map of the environment may be compared with the 2D image data associated with the environment. In some embodiments, comparing the map data corresponding to the map and the image data may include comparing pose data corresponding to respective poses of the one or more landmarks that may be common between the image data and the map data. In some embodiments, the ego-machine and/or the sensor corresponding to the ego-machine may be localized based on the comparison between the map data and the image data. Embodiments of the present disclosure may allow for localization of one or more systems corresponding to an environment using 2D map data; and, in some embodiments, using a single, monocular camera. In some embodiments, one or more embodiments may help to increase an effectiveness of one or more systems by decreasing a number of errors corresponding to one or more localization determinations.

For example, one or more embodiments, may allow for localization without errors associated with triangulating feature poses corresponding to one or more objects over time (e.g., one or more SLAM techniques). By determining one or more predicted image locations corresponding to a portion of an object and comparing the one or more predicted image locations to one or more ground plane locations determined using a 2D map projected in the 2D image space, one or more localization determinations may be performed more accurately and using less data as compared to one or more of the traditional localization techniques.

One or more of the embodiments disclosed herein may relate to one or more processes for localizing one or more systems, including autonomous and/or semi-autonomous systems, using 2D map data, where the map data may correspond to an environment in which one or more ego-machines may be located. The one or more ego-machines in the present disclosure may include any applicable machine or system that is capable of performing one or more autonomous and/or semi-autonomous operations. Example ego-machines may include, but are not limited to, vehicles (land, sea, space, and/or air), robots, robotic platforms, etc. By way of example, the ego-machine computing applications may include one or more applications that may be executed by an autonomous vehicle or semi-autonomous vehicle, such as an example autonomous or semi-autonomous vehicle or machine 500 (alternatively referred to herein as "vehicle 500" or "ego-machine 500) described with respect to FIGS. 5A-5D. In the present disclosure, reference to an "autonomous vehicle" or "semi-autonomous vehicle" may include any vehicle that may be configured to perform one or more autonomous or semi-autonomous navigation or driving operations. As such, such vehicles may also include vehicles in which an operator is required or in which an operator may perform such operations as well.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems that implement one or more language models, such as one or more large language models (LLMs) that process textual, audio, image, sensor, and/or other data types to generate one or more outputs, systems for hosting real-time streaming applications, systems for presenting one or more of virtual reality content, augmented reality content, or mixed reality content, systems for performing light transport simulation, systems for performing collaborative content creation for 3D assets, systems for performing generative AI operations, systems implemented at least partially using cloud computing resources, and/or other types of systems.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

With respect to FIG. 1A, FIG. 1A illustrates a flow diagram 100 for a process of localization, in accordance with one or more embodiments of the present disclosure. In some embodiments, a localization system 104 may be used to generate, compute, and/or otherwise determine localization data 110 corresponding to one or more machines and/or sensors corresponding to the one or more machines using image data 106 generated using an image sensor 102 and 2D map data 108 corresponding to a 2D map.

In some embodiments, the image sensor 102 may include one or more types of image sensors such as, for example, charge-coupled devices ("CCD"), complementary metal-oxide-semiconductor ("CMOS") sensors, etc. In some embodiments, CCD and CMOS sensors may be used in connection with one or more cameras to capture and/or generate image data 106 corresponding to one or more captured images. For example, the image sensor 102 may be used in connection with a monocular camera to generate image data 106 corresponding to an image of an environment in which a system may be located. In some embodiments, the image sensor 102 generating the image data 106 may be an example of multiple image sensors 102 that may be configured to capture image data 106 included in one or more images corresponding to an environment in which each of the image sensors 102 may be located. In some embodiments, the image sensor 102 may be located in the same environment as the localization system 104.

In some embodiments, the image sensor 102 may be configured to generate image data 106 associated with one or more images corresponding to the environment in which the image sensor 102 may be located. In some embodiments, the image sensor 102 may additionally be configured to generate other data corresponding to the image. For example, the image sensor 102 may generate metadata corresponding to the image—e.g., time stamps, sensor types, location information, etc. In some embodiments, the image sensor 102 may be used in conjunction with one or more imaging systems—e.g., a camera—that may generate one or more images using the image data 106.

The image data 106 may include data and/or information corresponding to an image that may be captured, the image corresponding to an environment and/or a portion of the environment in which the image sensor 102 may be located. In some embodiments, the image corresponding to the image data 106 may be a 2D visual representation of the environment or the portion of the environment corresponding to the image data 206.

In some embodiments, the image data 106 corresponding to a particular image may correspond to a particular image space. The particular image space may mathematically represent locations of one or more objects and/or portions of the image 120 using a particular coordinate system. The particular coordinate system may include two axes, which may include an x-axis and a y-axis as shown in the image 120 as $x_i$ and $y_i$ respectively. In some embodiments, reference to one or more locations in the image space corresponding to one or more portions of the image may include reference to a pair of coordinates—e.g., $(x_i, y_i)$.

In some embodiments, the particular image corresponding to the image space may include a representation of one or more objects corresponding to the environment. Further, the particular image corresponding to the image space may include a representation of the "ground," which may include a representation of the ground in the real-world.

Figure 1B:
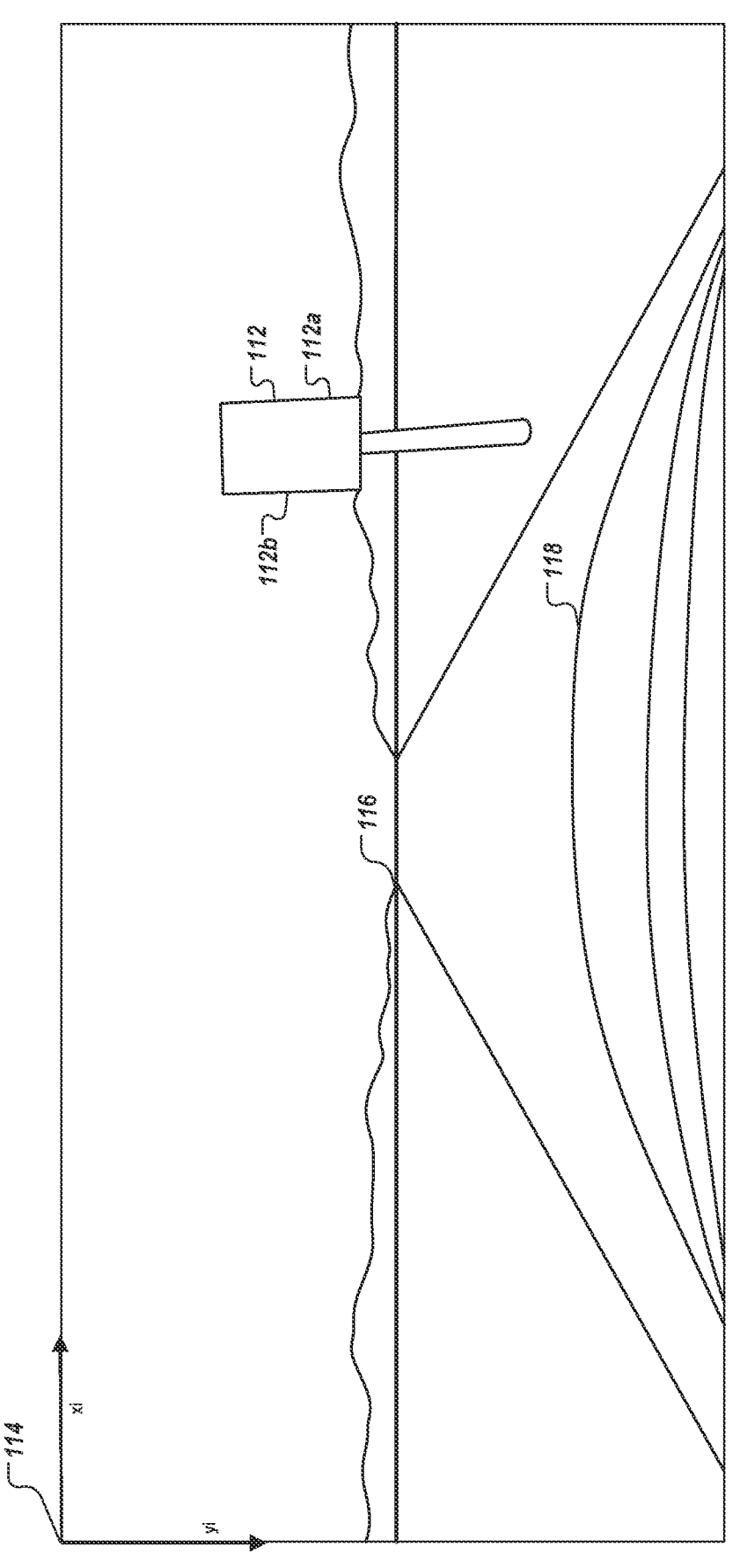
FIG. 1B illustrates an example diagram representing an image, in accordance with one or more embodiments in the present disclosure.

An example representation of image data 106 corresponding to a particular image is described and/or illustrated with respect to FIG. 1B. FIG. 1B illustrates an example diagram representing an image 120, in accordance with one or more embodiments in the present disclosure. While illustrated in the context of a vehicle on a road, the image 120 may include a 2D representation of a number of different environments corresponding to different sensors—e.g., the image sensor 102 described with respect to FIG. 1A, and/or one or more machines and/or systems corresponding to the different sensors.

In some embodiments, the image 120 may be captured and/or generated using an image sensor, such as, for example the image sensor 102. As illustrated in FIG. 1B, the image 120 may have been captured using a monocular camera or other imaging system located, for example, in the middle of a vehicle. For example, as shown in FIG. 1B, a front hood and/or a portion of a windshield may be shown corresponding to a vehicle 118. The image 120 showing a perspective corresponding to the image sensor associated with the vehicle 118 at a particular time and corresponding to a particular location. In some embodiments, the image 120 may also establish a particular angle of the image sensor.

In some embodiments, the 2D representation of the environment may be a representation of a particular image space, the image space mathematically representing locations of one or more objects and/or portions of the image 120 with respect to an origin 114. In some embodiments, the origin 114 may define and/or establish a reference point to which one or more portions of the image space may be related. In some embodiments, the origin 114 may be defined with an x-axis and y-axis, as shown in the image 120 as $x_i$ and $y_i$ respectively, where the origin may be defined as the reference point (0, 0) corresponding to the image space.

In some embodiments, from the origin 114, one or more locations of objects (e.g., the object 112) may be defined. In some embodiments, the origin 114 may be located in the top-left corner of the image 120. Additionally or alternatively, the origin 114 may be located and/or defined in one or more other locations in the image 120 such as, for example, a bottom right corner, bottom-left corner, top-right corner, bottom-middle of the image 120, and any other point in the image 120. In some embodiments, the origin 114 may be established and/or defined corresponding to respective images 120 that may be generated using, for example, the image sensor 102. For example, the image 120 may be a first image representing a first image space with a first origin 114. Continuing the example, another image may be taken of the same environment using a different image sensor, a different angle, a different time, etc. The second image may represent a second image space with a second origin 114. In some embodiments, the image space represented using the image 120 may be bounded by the image 120 and/or may be different for individual images that may be generated using an image sensor, e.g., the image sensor 102.

In some embodiments, the image 120 may include one or more objects and/or landmarks, such as, for example, the object 112. The object 112 in the image 120 may be a 2D representation of a sign; in particular, a speed limit sign corresponding to the stretch of road on which the vehicle 118 may be navigating. In some embodiments, the object 112 may correspond to a particular portion of the environment defined using coordinates (xi, yi) respectively corresponding to the origin 114. As represented by the image 120, the object 112, in the real-world space, may be to the right of the vehicle 118, from the perspective of the vehicle 118, and some distance in front of the vehicle 118.

In some embodiments, one or more portions of the object 112 may be identified corresponding to one or more respective locations in the image space. For example, the object 112 may include a first side 112a which may represent a right-hand portion of the object 112. The object may additionally include a second side 112b that may represent a left-hand portion of the object 112. In some embodiments, a footprint of the object 112 or a size corresponding to the object 112 may be determined in the image space corresponding to the image 120 using coordinates corresponding to one or more portions of the object 112—e.g., a first portion 112a and/or a second portion 112b.

In some embodiments, the image 120 may include a horizon 116. The horizon 116 may indicate a portion of the image 120 that may represent a ground plane corresponding to the real-world environment. For instance, the horizon 116 may be a point or a line of demarcation between a representation of the ground in the real-world environment and a representation of the sky or above-the-ground in the real-world environment. The real-world environment may be defined in three dimensions (X, Y, Z) and the ground plane corresponding to the ground may be defined using the plane (X, Z), for example. In the image space corresponding to the image 120, the horizon 116 may indicate a representation of the ground that may correspond to the ground plane (X, Z) in the real-world environment.

Modifications, additions, or omissions may be made to FIG. 1B without departing from the scope of the present disclosure. For example, the placement of the origin 114, the environment captured by the image 120, the angle of an image sensor capturing the image 120, the number of objects 112 and/or the number of portions of the object 112, the placement or existence of the horizon 116, the presence of the vehicle 118, etc. The specifics given and discussed are to help provide explanation and understanding of concepts of the present disclosure and are not meant to be limiting.

Returning to the description of FIG. 1A, in addition to the image 120 as described and illustrated in FIG. 1B, the image data 106 may include metadata corresponding to the image sensor 102 and/or the image 120. In some embodiments, the metadata may indicate one or more intrinsic characteristics associated with the image sensor 102. For example, the metadata may include time of day corresponding to when the image data 106 was captured and/or generated, type of image sensor 102, resolution corresponding to the image, lens type, focal length, aperture, lens quality, shutter speed, image processing, etc. In some embodiments, the metadata that may be included in the image data 106 may be generated as a result of one or more calibration processes.

Further, in some embodiments, the image data 106 corresponding to the image (e.g., the image 120) may be transmitted, sent, or otherwise communicated to the localization system 104. In some embodiments, the localization system 104 may correspond to a same system and/or machine as the image sensor 102. For example, the image sensor 102 may be located in an ego-machine. Continuing the example, the localization system 104 may also be located in the ego-machine and the sensor data 106 may be communicated between the image sensor 102 and the localization system 104 using one or more cables and corresponding data transfer protocols.

Additionally or alternatively, the image sensor 102 may be associated with one or more other systems and/or machines as compared to the systems and/or machines to which the localization system 104 may correspond. For example, again in the context of an ego-machine navigating a particular environment, the image sensor 102 may correspond to the ego-machine. For instance, the image (e.g., the image 120) may be captured using the image sensor 102 that may be located on or in the ego-machine. Continuing the example, the image data 106 generated using the image sensor 102 may be sent to one or more other systems, servers, edge servers, computing systems, etc. to which the localization system 104 may correspond.

In some embodiments, the localization system 104 may be configured to perform localization based on a comparison between the image data 106 and 2D map data 108 corresponding to a 2D map. In some embodiments, the localization system 104 may be configured to receive and/or otherwise obtain the 2D map data 108.

In some embodiments, the 2D map may be a 2D representation of the environment that may be generated using the 2D map data 108. The environment may correspond to a location at which the image sensor 102 may be located. For example, the 2D map data 108 may correspond to one or more objects, locations, streets, etc. without data and/or information corresponding to the height of the one or more objects. For instance, the 2D map may include data and/or information associated with a 2D representation of the real-world space. For example, the real-world space may be defined using a cartesian coordinate system. More specifically, the real-world space may be defined using three dimensions (X, Y, Z), where XZ defines a plane corresponding to the ground. In some embodiments, the 2D map data may include data corresponding to the 3D environment that may be flattened and defined using the XZ ground plane. As such, coordinates corresponding to objects represented using the 2D map data 108 may include coordinates in the form (X, Z).

In some embodiments, the 2D map data 108 may illustrate one or more locations corresponding to the one or more objects and/or characteristics of a particular environment. In some embodiments, the 2D map data 108 corresponding to the 2D map may include information corresponding to one or more locations of one or more objects. For example, the 2D map data 108 may include coordinates and location information determined using data from one or more sources, such as, for example, one or more global information systems (GIS) databases, mapping services, aerial imagery, etc. In these and other embodiments, the 2D map may illustrate the one or more objects in a way that may correspond to location information included in the 2D map data 108 corresponding to the one or more objects.

For example, a pole may be located in the real-world space (e.g., a telephone pole, a light pole, etc.). The real-world space may be defined using a coordinate system (X, Y, Z). In some embodiments, X defines a lateral direction or horizontal direction and distance to the pole from a real-world origin point, Z defines a depth to the pole from the real-world origin point, and Y defines a height or vertical direction and distance to the pole from the real-world origin point. In some embodiments, the real-world origin point may be different from the origin point 114 associated with one or more image spaces corresponding to one or more respective images (e.g., the image 120). Continuing the example, the 2D map data 108 may correspond to a location of the pole with respect to the origin point on the XZ plane as defined in the real-world space—the XZ plane referred to hereinafter as the "ground plane." In some embodiments, the 2D map may be a visual representation of the 2D ground plane.

As an additional example, the 2D map data 108 may correspond to a 2D map of the same environment represented by the image 120 described and/or illustrated further in the present disclosure, such as, for example, with respect to FIG. 1B. The 2D map data 108 may include, for example, a location of the object 112, the road depicted in the image 120, and so on.

In some embodiments, the localization system 104 may be configured to receive and/or otherwise obtain the 2D map data 108, the 2D map corresponding thereto and/or the image data 106 to determine, compute, and/or otherwise generate localization data 110.

In some embodiments, the localization system 104 may include code and routines configured to allow a computing system to perform one or more operations. Additionally or alternatively, the localization system 104 may be implemented using hardware including one or more processors, CPUs graphics processing units (GPUS), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators (DLAs)), and/or other processor types. In these and other embodiments, the localization system 104 may be implemented using a combination of hardware and software. In the present disclosure, operations described as being performed by the localization system 104 may include operations that the localization system 108 may direct a corresponding computing system to perform. In these or other embodiments, the localization system 104 may be implemented by one or more computing devices, such as that described in further detail with respect to FIGS. 5A-5D, 6, and/or 7.

In some embodiments, the localization system 104 may compare the image data 106 and the 2D map data 108 by projecting, overlaying, or otherwise integrating the 2D map in the image corresponding to the image data 106. In some embodiments, comparing the 2D map data 108 and the image data 106 may include comparing pose data corresponding to respective poses of the one or more objects that may be common between the image data 106 and the 2D map data 108. In some embodiments, the pose data corresponding to the one or more objects in the 2D map data 108 corresponding to the 2D map may be determined based on a corresponding pose (e.g., location and orientation) of the ego-machine and/or the image sensor corresponding to the image data 106. For example, the image data 106 may include a depiction of a road sign included in the image, and the 2D map data 108 may include corresponding pose data that indicates a ground plane location corresponding to the road sign based on location and orientation information associated with the ego-machine.

In some embodiments, the pose data indicating the ground plane location of the road sign may be projected or overlayed onto the image space. Further, the projected pose data indicating the ground plane location of the road sign may be compared to the depiction of the road sign included in the image—e.g., the image 120 described and/or illustrated further in the present disclosure, such as, for example, with respect to FIG. 1B.

In some embodiments, the localization system 104 may be configured to determine a cost or an error based on the comparison between the projected pose data indicating the ground plane location of the road sign and the depiction of the road sign included in the image corresponding to the image data 106. In some embodiments, the cost or error satisfying a particular threshold may indicate that the pose data corresponding to the 2D map data 108 matches or nearly matches the depiction of the road sign included in the image corresponding to the image data 106. Correspondingly, the cost or error satisfying a particular threshold may indicate that estimated pose data associated with the image sensor 102 may be correct or nearly correct. In some embodiments, correct or nearly correct may indicate that a location and/or orientation of the image sensor 102 in the 2D map data 108 corresponding to the 2D map matches or nearly matches the image data 106 corresponding to the image.

Additionally or alternatively, the cost or error not satisfying the particular threshold may indicate that the 2D map data 108 corresponding to a pose associated with the image sensor 102 does not match the depiction of the road sign included in the image and, correspondingly, that the location and/or orientation of the image sensor 102 in the 2D map does not match the image data 106 corresponding to the image. In some embodiments, the 2D map not matching the image data 106 may indicate that the location and/or orientation of the image sensor 102 in the 2D map data 108 is incorrect.

In some embodiments, in response to the cost and/or error not satisfying a particular threshold, the localization system 104 may be configured to adjust the estimated pose corresponding to the image sensor 102 and/or the ego-machine associated with the image sensor 102. In some embodiments, the estimated pose may be adjusted iteratively until the cost satisfies a particular threshold. In some embodiments, the cost satisfying the particular threshold may indicate that the pose corresponding to the image sensor 102 is correct relative to the object in the environment. In some embodiments, the comparison of the image data 106 corresponding to the image and the 2D map may be described and/or illustrated in more detail in the present disclosure, such as, for example, with respect to FIGS. 2A-3.

In some embodiments, the localization system 104 may be configured to generate localization data 110 based on the comparison between the image data 106 and the 2D map 108. The localization data 110 may include data and/or information corresponding to one or more locations corresponding to the image sensor 102 and/or one or more systems, machines, etc. that may correspond to the image sensor 102. In some embodiments, the localization data may include position data (e.g., latitude and longitude, position data corresponding to the 2D map 108, coordinates associated with one or more other maps or coordinate systems, etc.), orientation data (e.g., rotation information corresponding to one or more different axes, for example, roll, pitch, and yaw data corresponding to rotation about three different axes), cost data or other error data associated with the position of the image sensor 102 and/or corresponding system, position data corresponding to one or more other objects and/or landmarks in the environment, time stamp data, etc.

In some embodiments, the localization data 110 may be used by one or more systems, for example, to generate one or more control commands, etc. For example, one or more planning systems and/or subsystems corresponding to an ego-machine may use the localization data 110 to generate one or more planned paths from a first position to a second position in an environment. Additionally or alternatively, the localization data 110 may be used by one or more perceptions systems and/or subsystems to determine whether one or more evasive actions need to be taken to avoid one or more objects, obstacles, pedestrians, etc.

Modifications, additions, or omissions may be made to FIG. 1A without departing from the scope of the present disclosure. For example, the amount of image data 106, the environment corresponding to the image data 106 and/or the 2D map 108, the number of systems, subsystems, modules, etc. used to perform operations corresponding to the localization system 104, the number of image sensors, and the amount and type of localization data 110 may vary. The specifics given and discussed are to help provide explanation and understanding of concepts of the present disclosure and are not meant to be limiting.

Figure 2A:
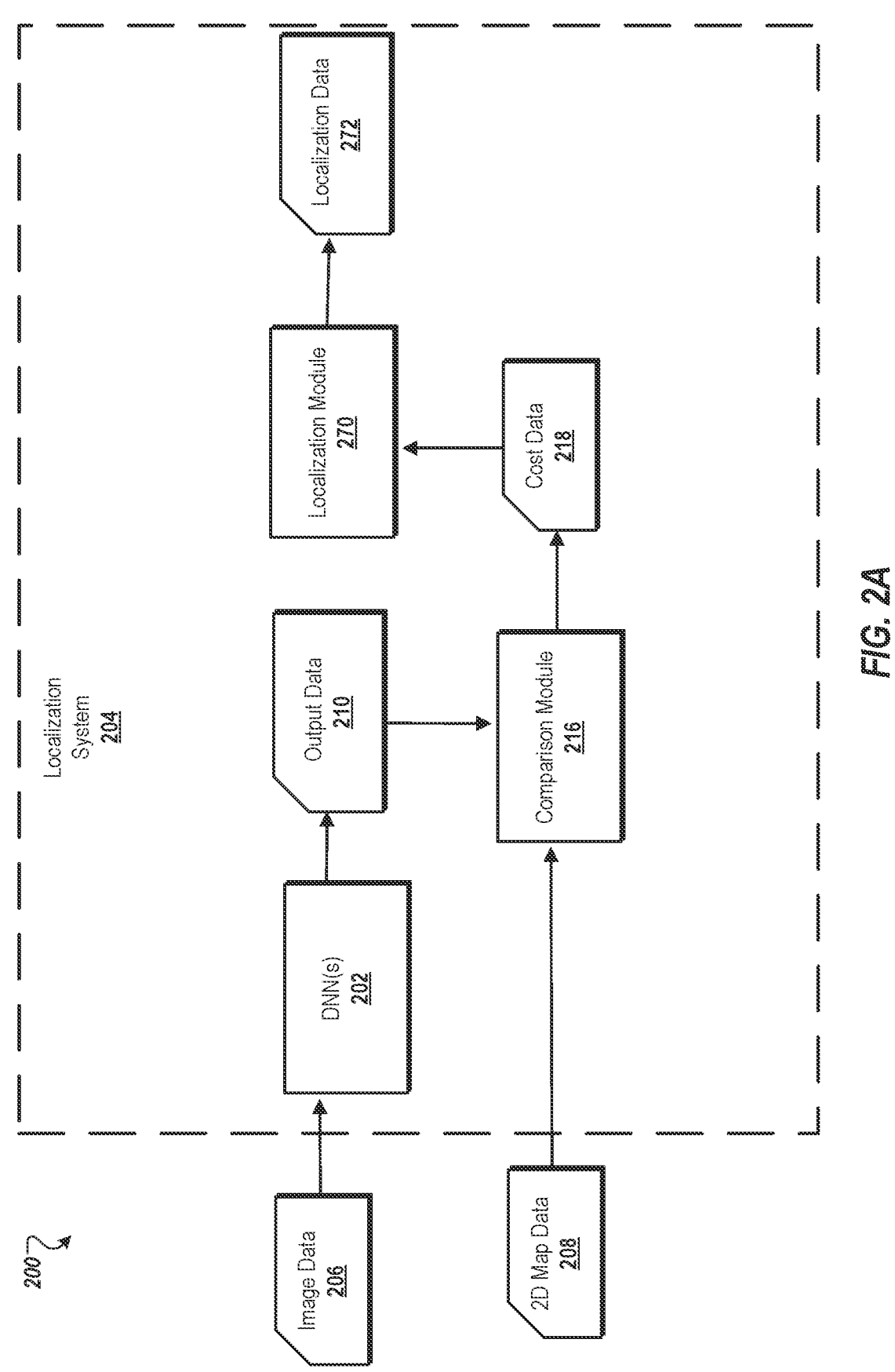
FIG. 2A is a diagram representing an example environment related to determining and/or generating localization data using a localization system, in accordance with one or more embodiments of the present disclosure.

FIG. 2A is a flow diagram related to determining and/or generating localization data 210 using a localization system 204, in accordance with one or more embodiments of the present disclosure. In some embodiments, the example environment 200 may be an example implementation of the environment 100 and the localization system 204 may be an example implementation of the localization system 104 described and/or illustrated further in the present disclosure, such as, for example, with respect to FIG. 1A. In some embodiments, the localization system 204 may be an example implementation of one or more other localization systems such as, for example, described with respect to U.S. Non-Provisional application Ser. No. 17/007,873, filed on Aug. 31, 2020, titled "MAP CREATION AND LOCALIZATION FOR AUTONOMOUS DRIVING APPLICATIONS," which is incorporated by reference herein in its entirety.

In some embodiments, the localization system 204 may include one or more DNN(s) 202, a comparison module 216, and/or localization module 270 that may be configured to calculate, generate, and/or otherwise determine localization data 210 based on image data 206 and 2D map data 208.

In some embodiments, the DNN(s) 202, the cost space system 216, and/or the localization module 270 may include code and routines configured to allow a computing system to perform one or more operations. Additionally or alternatively, the DNN(s) 202, the comparison module 216, and/or the localization module 270 may be implemented using hardware including one or more processors, CPUs graphics processing units (GPUs), data processing units (DPUs), parallel processing units (PPUs), microprocessors (e.g., to perform or control performance of one or more operations), field-programmable gate arrays (FPGA), application-specific integrated circuits (ASICs), accelerators (e.g., deep learning accelerators (DLAs)), and/or other processor types. In these and other embodiments, the DNN(s) 202, the comparison module 216, and/or the localization module 270 may be implemented using a combination of hardware and software. In the present disclosure, operations described as being performed by the DNN(s) 202, the comparison module 216, and/or the localization module 270 may include operations that the DNN(s) 202, the comparison module 216, and/or the localization module 270 may direct a corresponding computing system to perform. In these or other embodiments, the DNN(s) 202, the comparison module 216, and/or the localization module 270 may be implemented by one or more computing devices, such as that described in further detail with respect to FIGS. 5A-5D, 6, and/or 7.

In some embodiments, the image data 206 may be sent, transmitted, and/or otherwise communicated to the DNN(s) 202. In some embodiments, prior to receipt by the DNN(s) 202, the image data 206 may undergo pre-processing, such as to convert, crop, upscale, downscale, zoom in, rotate, and/or otherwise modify the image data 206. For example, the image data 206 may be cropped, downscaled, upscaled, flipped, rotated, and/or otherwise adjusted to a suitable input format for the respective DNN(s) 202. In some embodiments, the image data 206 may represent a video (e.g., snapshots of video). For example, any type of image data 206 format may be used, such as, for example, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the image data 206 may be used without any pre-processing (e.g., in a raw or captured format), while in other examples, the image data 206 may undergo pre-processing (e.g., noise balancing, demosaicing, scaling, cropping, augmentation, white balancing, tone curve adjustment, etc., such as, for example, using one or more pre-processing systems and/or processes.

In some embodiments, the image data 206 may correspond to one or more images that may have been generated using one or more image sensors. In some embodiments, the image data 206 may be the same as, and/or analogous to the image data 106 described and/or illustrated further in the present disclosure, such as, for example, with respect to FIG. 1A. Additionally or alternatively, the one or more images that may correspond to the image data 206 may be analogous to the image 120 described and/or illustrated further in the present disclosure, such as, for example, with respect to FIG. 1B.

In some embodiments, the one or more DNN(s) 202 may be configured to obtain the image data 206. In some embodiments, the DNN(s) 202 may be configured to perform one or more operations using the image data 206 to determine and/or generate output data 210. Although examples are described herein with respect to using the DNNs(s) 202, this is not intended to be limiting. For example, the DNN(s) 202 may include any type of machine learning model or algorithm, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), areas of interest detection algorithms, computer vision algorithms, and/or other types of algorithms or machine learning models.

As an example, the DNNs 202 may process the sensor data 102 to generate detections of lane markings, road boundaries, signs, poles, trees, static objects, vehicles and/or other objects, etc. For example, the detections may correspond to locations (e.g., in 2D image space), geometry, pose, semantic information, and/or other information about the detection.

In some embodiments, the DNN(s) 202 may be configured to determine one or more locations corresponding to representations of one or more objects in an image space corresponding to an image. In some embodiments, the one or more locations corresponding to the object in the image space may include one or more points of interest corresponding to the object. In some embodiments, points of interest may include reference points corresponding to the object from which the DNN(s) 202 may determine one or more predicted ground locations in the image space that may correspond to 2D map data 208 corresponding to a 2D map.

In some embodiments, the one or more points of interest corresponding to the object may include any portion of the depiction of the object in the image space. In some embodiments, for example, the one or more points of interest may include one point corresponding to a portion of the object that is substantially vertical (e.g., that substantially lines up with the $y_i$ axis in the image space). In some embodiments, for example, the one or more points of interest may correspond to each corner, edge, middle, etc. corresponding to the representation of the object in the image space. In some embodiments, the one or more points of interest may be determined using one or more heuristic analyses to determine which points of interest produce effective results in comparing the one or more predicted image locations and the 2D map data 208 corresponding to the 2D map.

For example, in the context of autonomous vehicles, the DNN(s) 202 may detect one or more road signs corresponding to the environment. Continuing the example. The one or more points of interest may include one or more locations in an image space corresponding to the image. Further, the one or more points of interest may include one or more image space locations corresponding to one or more sides of the road sign, a pole holding the road sign, and any other location corresponding to the road sign.

Additionally or alternatively, the DNN(s) 202 may be configured to determine one or more predicted image locations associated with the one or more determined image locations corresponding to representations of the one or more objects. In some embodiments, reference to the one or more predicted image locations may include one or more estimated locations of where the object, as represented in the 2D map, would be in the image space assuming the 2D map is superimposed into the image space. The superimposed 2D map representing the object from the perspective corresponding to the estimated pose of a corresponding machine and/or the image sensor at a time when the image is captured. For instance, the one or more predicted image locations may be estimated to coincide with one or more object locations in an image space where the 2D map data 208 may represent objects flattened onto a ground plane in the real-world environment and projected or overlayed in the image space.

In some embodiments, the one or more predicted image locations may correspond to one or more points of interest corresponding to the object and the ground in the image space representing the ground or a ground plane in the real-world environment.

Figure 2B:
FIG. 2B illustrates an example diagram representing an image; one or more first predicted image locations and one or more second predicted image locations corresponding to an object, in accordance with one or more embodiments of the present disclosure.

An example implementation of determining one or more predicted image locations corresponding to a particular object may be described and/or illustrated with respect to FIG. 2B, FIG. 2B illustrates an example diagram representing an image 220, a detected object 212, one or more first predicted image locations 224 and one or more second predicted image locations 226 corresponding to the object 212, in accordance with one or more embodiments of the present disclosure. While illustrated in the context of a road sign corresponding to a road, the image 120 may include a 2D representation of a number of different environments corresponding to different sensors—e.g., the image sensor 102 described with respect to FIG. 1A, and/or one or more machines and/or systems corresponding to the different sensors, e.g., the vehicle 118 described, for example, with respect to FIG. 2B.

In some embodiments, the image 220 may correspond to image data generated and/or collected using one or more sensors. For example, the image 220 may correspond to the image data 206 and/or the image data 106 described and/or illustrated further in the present disclosure, such as, for example, with respect to FIGS. 1A and/or 2A.

In some embodiments, the image 220 may include an origin 214, the origin 214 may define and/or establish a reference point to which one or more portions of the image space may be related. In these or other embodiments, the origin 214 may be the same as, and/or analogous to, the origin 114 described and/or illustrated further in the present disclosure, such as, for example, with respect to FIG. 1B.

In some embodiments, the image 220 may include one or more objects and/or landmarks, such as, for example, the object 212. The object 212 in the image 220 may be a 2D representation of a sign. In particular, the object 212 may be a speed limit sign corresponding to the stretch of road. In some embodiments, the object 212 may correspond to a particular portion of the environment defined using coordinates $(x_i, y_i)$ respectively corresponding to the origin 214. Further, one or more portions of the object 212 may be identified based on one or more respective locations in the image space. For example, the object 212 may include a first side 212$a$ which may represent a right-hand portion of the object 212. The object 212 may additionally include a second side 212*b* that may represent a left-hand portion of the object 212. In these or other embodiments, the object 212, the first side 212*a*, and/or the second side 212*b* may be the same as and/or analogous to, the object 112, the first side 112*a*, and/or the second side 112*b* described and/or illustrated further in the present disclosure, such as, for example, with respect to FIG. 1B.

In some embodiments, the image 220 may include one or more points of interest corresponding to the object 212. As illustrated in FIG. 2B, the object 212 includes a first point of interest that may correspond to the first side 212*a* of the object 212 and a second point of interest that may correspond to the second side 212*b* of the object 212.

In some embodiments, the image 220 may include a horizon 226, which may delineate or indicate a difference between a first portion of the image 220 corresponding to the ground in the real-world environment and a second portion of the image 220 corresponding to locations located above the ground in the real-world environment. For example, as illustrated in FIG. 2B, the first portion of the image 220—the portion of the image 220 that may correspond to the ground in the real-world environment—may include the portion of the image 220 below the horizon 226.

In some embodiments, the image 220 may not include a horizon 226. Rather, the image data (e.g., image data 206) corresponding to the image 220 may provide one or more other indicators that may differentiate between portions of the image 220 corresponding to the ground and portions of the image that may correspond to one or more locations above the ground in the real-world environment.

In some embodiments, one or more predicted image locations 222 may be determined. In some embodiments, the one or more predicted image locations 222 may correspond to one or more points of interest corresponding to the object 212.

In some embodiments, the first predicted image locations 222*a* may correspond to any point located on a first line segment extending from the first side 212*a* of the object 212 (the first point of interest) vertically along the $y_i$ axis to a bottom portion of the image 220. In some embodiments, the first predicted image locations 222*a* may correspond only to those locations located on the first line segment, the first line segment bounded by the horizon 226 and the bottom portion of the image 220.

As illustrated in FIG. 2B, the dashed lines extending from the first side 212*a* and the second side 212*b* of the object 212 may not be included in the first predicted image locations and/or the second predicted image locations. Rather, the dashed lines are meant to illustrate that the first predicted image locations and the second predicted image locations correspond to line segments corresponding to the ground and that lay on the same line as the points of interest corresponding to the object 212.

In some embodiments, the first line segment may be bounded only by the horizon 226 and the bottom portion of the image 220 may be extended using other data and/or information corresponding to the environment depicted in the image 220. For example, in instances where the bottom portion of the image 220 is occluded, the object is partially occluded, and/or the ground is occluded, the DNN(s) 202 may determine one or more predicted locations 222 based on other data corresponding to the environment and/or the image space—e.g., using past image data corresponding to the environment depicted in the image 220.

In some embodiments, the second predicted image locations 222*b* may correspond to any point located on a second line segment extending from the second side 212*b* of the object 212 vertically to a bottom portion of the image 220. In some embodiments, the second predicted image locations 222*b* may correspond only to those locations located on the second line segment, the second line segment bounded by the horizon 226 and the bottom portion of the image 220. In some embodiments, the second line segment may be bounded only by the horizon 226 and the bottom portion of the image 220 may be extended using other data and/or information corresponding to the environment depicted in the image 220.

In some embodiments, the first predicted image locations 222*a* and/or the second predicted image locations 222*b* may be located on line segments that may align or substantially align with the $y_i$-axis. In some embodiments, the first predicted image locations 222*a* and/or the second predicted image locations 222*b* may align or substantially align with the $y_i$-axis because the image sensor—e.g., the camera—that may have captured the image 220 may be oriented perpendicular to a gravitational vector corresponding to the real-world environment that may be represented in the image 220. Many variations exist where the camera may not be aligned in a manner that is perpendicular to the gravitational vector, those variations may be described and/or illustrated further in the present disclosure, such as, for example, with respect to FIGS. 2A and 2C-2G.

Modifications, additions, or omissions may be made to FIG. 2B without departing from the scope of the present disclosure. For example, the placement of the origin 214, the environment captured by the image 220, the angle of an image sensor capturing the image 220, the number of objects 212 and/or the number of portions of the object 212, the placement or existence of the horizon 216, etc. may vary. The specifics given and discussed are to help provide explanation and understanding of concepts of the present disclosure and are not meant to be limiting.

Returning to the description of FIG. 1A, the DNN(s) 202 may be configured to determine the one or more predicted image locations based on a vanishing point. The term "vanishing point" may include a point or multiple points in the real-world space where parallel lines appear to converge. In some embodiments, the one or more predicted image locations may be determined based on a projection of the vanishing point into the image space using one or more equations and/or algorithms.

For example, the vanishing point may be projected into the image space using one or more pinhole projection models to determine where seemingly parallel lines may converge in the image space. In some embodiments, for example, the vanishing point may be determined using the gravitational vector and one or more intrinsic characteristics corresponding to the camera (e.g., focal length, calibration determinations, etc.). Example equations for projecting the vanishing point to the image space are defined below:

$$v_{xi} = f_{xi} \frac{D_x}{D_z} + c_x \tag{1}$$

$$v_{yi} = f_{yi} \frac{D_y}{D_z} + c_y \tag{2}$$

Where $v_{xi}$ represents a projection in the image space of the vanishing point in the x-direction, $v_{yi}$ represents a projection in the image space of the vanishing point in the y-direction. Where $D_x$, $D_y$, and $D_z$ respectively represent the gravitational vector corresponding to the real-world space in the X, Y, and Z, directions respectively. Where $f_x$, and $f_y$ represent the focal length corresponding to the lens used with the camera in the x and y directions respectively in the image space. And where $c_x$ and $c_y$ represent the principle point of the camera and/or image sensor that may have generated and/or captured the image data 206. In some embodiments, the principal point may include the point through which the center of the lens's optical axis corresponding to the camera passes and where light rays converge to create a focused image on the sensor.

Furthermore, in some embodiments, the one or more predicted image locations may be determined based on the depiction of the ground in the image space. In some embodiments, the one or more predicted image locations may correspond to a line segment beginning from a point of interest in the image space corresponding to the representation of the object and ending at the vanishing point projected in the image space. The one or more predicted image locations may correspond to a portion of the line segment that also lies on a depiction of the ground in the image space.

In some embodiments, taking FIG. 2B as an example, in instances where the camera is oriented perpendicularly with respect to the gravitational vector, the predicted image locations may be located on a line segment substantially aligned with the $y_i$-axis corresponding to the image space. In instances where the camera and/or image sensor may not be oriented perpendicularly with respect to the gravitational vector, such as, for example, where the camera may be rotated along one or more axes, the one or more predicted image locations may be located on a line segment associated with the one or more points of interest corresponding to the representation of the object in the image space and the vanishing point projected into the image space.

Figure 2C:
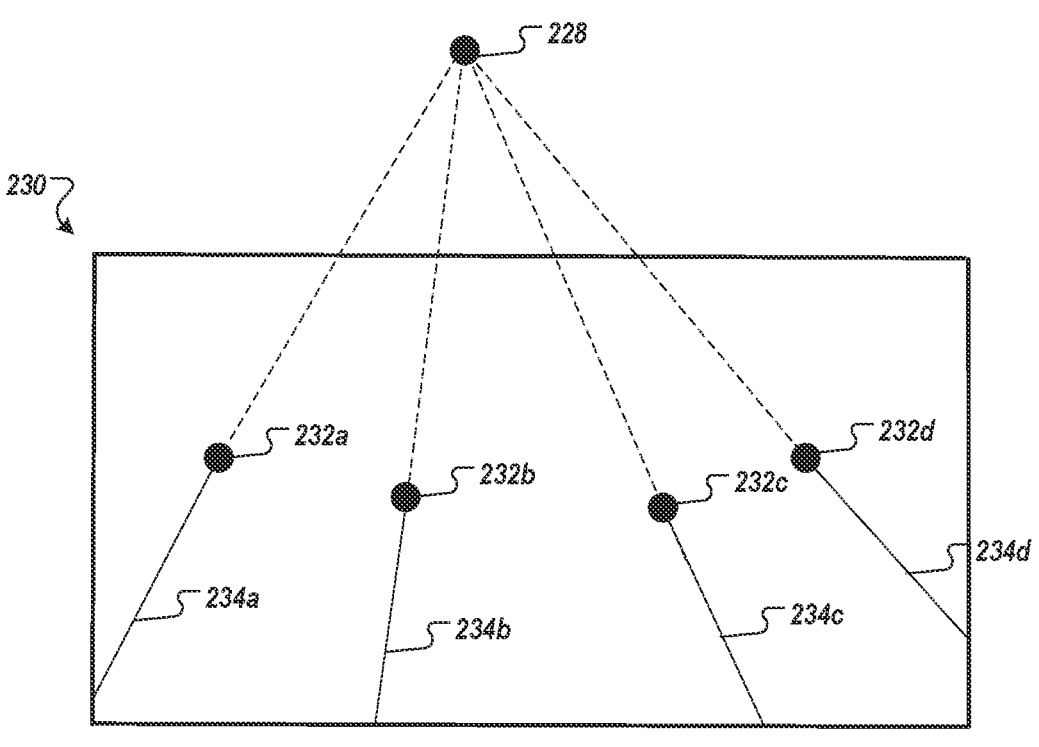
FIGS. 2C-2D illustrate example diagrams respectively representing an image and a vanishing point that may be projected into the image space, in accordance with one or more embodiments of the present disclosure.
Figure 2D:
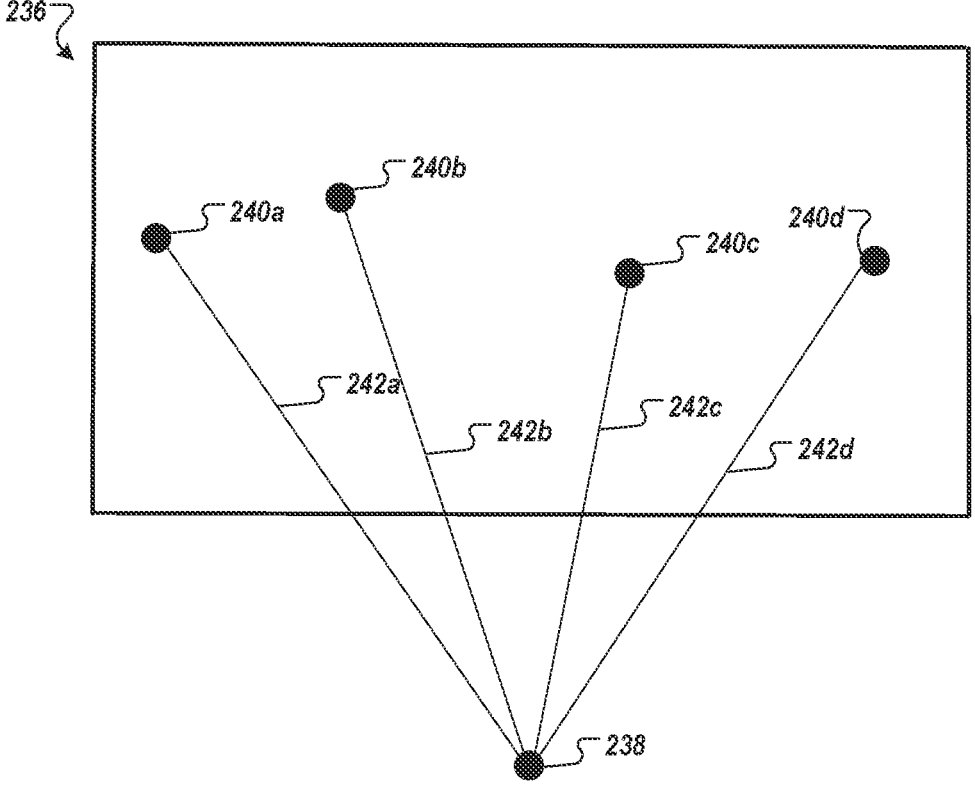

Example implementations of determining one or more predicted image locations based on a projected vanishing point corresponding to a particular image may be described and/or illustrated with respect to FIGS. 2C and 2D, FIG. 2C illustrates an example diagram representing an image 230 and a vanishing point 228 that may be projected into the image space, in accordance with one or more embodiments of the present disclosure.

In some embodiments, the image 230 may be an example of one or more images corresponding to image data collected and/or generated using one or more image sensors. In these or other embodiments, the image 230 may include a representation of one or more points of interest 232 corresponding to one or more objects that may be located in an image space corresponding to the image 230.

The image 230 includes four different points of interest corresponding to one or more objects. A first point of interest 232a, a second point of interest 232b, a third point of interest 232c, and fourth point of interest 232d. As illustrated in the image 230, the vanishing point 228 may be projected into the image space corresponding to the image 230. In some embodiments, the vanishing point 228 may correspond to a point that lies above the image 230 in the image space. In some embodiments, while the vanishing point 228 is shown outside of the image 230, the point corresponding to the vanishing point 228 is a representation corresponding to the vanishing point in the real-world environment projected into a representation of the image space.

In some embodiments, the vanishing point 228 may be located above the image 230 in the image space as a result of the orientation of the camera and/or image sensor that may be configured to collect and/or generate the image data corresponding to the image 230. For example, the camera may rotated about one or more axes associated with the orientation of the camera in the real-world environment. As a result, the vanishing point 228 may be located above the image 230 in the image space.

In some embodiments, one or more predicted image locations 234 may be determined by extending a line segment in the image space from the vanishing point 228 through respective points of interest 232 corresponding to the image 230. Because the one or more predicted image locations 234 correspond both to the points of interest and the representation of the ground in the image space, the one or more predicted image locations 234 may be determined to be below the one or more points of interest 232 in the image 230 as represented in FIGS. 2C and 2D as solid line segments as compared with the dotted line segments.

In some embodiments, individual points of interest 232 may correspond to one or more predicted image locations 234. As illustrated in FIG. 2C, the first point of interest 232a may correspond to one or more first predicted image locations 234a, the second point of interest 232b may correspond to one or more second predicted image locations 234b, the third point of interest 232c may correspond to one or more third predicted image locations 234c, the fourth point of interest 232d may correspond to one or more fourth predicted image locations 234d, and so on.

In some embodiments, a vanishing point may be located beneath an image. For example, FIG. 2D illustrates an example diagram representing an image 236 and a vanishing point 238 that may be projected beneath the image 236 in the image space, in accordance with one or more embodiments of the present disclosure. In some embodiments, the vanishing point 238 may be located beneath the image 236 in the image space as a result of the orientation of the camera and/or image sensor that may be configured to collect and/or generate the image data corresponding to the image 236. For example, the camera may be rotated about one or more axes associated with the orientation of the camera in the real-world environment. As a result, the vanishing point 238 may be located beneath the image 236 in the image space.

The image 236 may include four different points of interest corresponding to one or more objects. A first point of interest 240a, a second point of interest 240b, a third point of interest 240c, and fourth point of interest 240d. As illustrated in the image 236, the vanishing point 238 may be projected into the image space corresponding to the image 236.

In some embodiments, one or more predicted image locations 242 may be determined by extending a line segment in the image space from the vanishing point 238 to respective points of interest 240 corresponding to the image 236. Because the one or more predicted image locations 242 correspond both to the points of interest 240 and the representation of the ground in the image space, the one or more predicted image locations 242 may be determined to be below the one or more points of interest 240 in the image 236.

In some embodiments, individual points of interest 240 may correspond to one or more predicted image locations 242. As illustrated in FIG. 2D, the first point of interest 240a may correspond to one or more first predicted image locations 242a, the second point of interest 240b may correspond to one or more second predicted image locations 242b, the third point of interest 240c may correspond to one or more third predicted image locations 242c, the fourth point of interest 240d may correspond to one or more fourth predicted image locations 242d, and so on.

Modifications, additions, or omissions may be made to FIGS. 2C and/or 2D without departing from the scope of the present disclosure. For example, the location of the vanishing point 228 and/or the vanishing point 238 in respective image spaces, the environment captured by the image 230 and/or the image 236, the angle of an image sensor capturing the image 230 and/or the image 236, the number of points of interest 232 and/or points of interest 240, the location and/or orientation of the one or more predicted image locations 234 and/or the one or more predicted image locations 242 may vary. The specifics given and discussed are to help provide explanation and understanding of concepts of the present disclosure and are not meant to be limiting.

Returning to the description of FIG. 2A, the DNN(s) 202 may additionally be configured to determine one or more predicted image locations that may correspond to multiple points of interest corresponding to one or more objects in an image. In some embodiments, the number of points of interest may vary. In some embodiments, an individual point of interest may be used to determine one or more predicted image locations corresponding to an object. Additionally or alternatively, multiple points of interest may be used to determine the one or more predicted image locations corresponding to the one or more objects in the image.

Figures 2E, 2F, 2G:
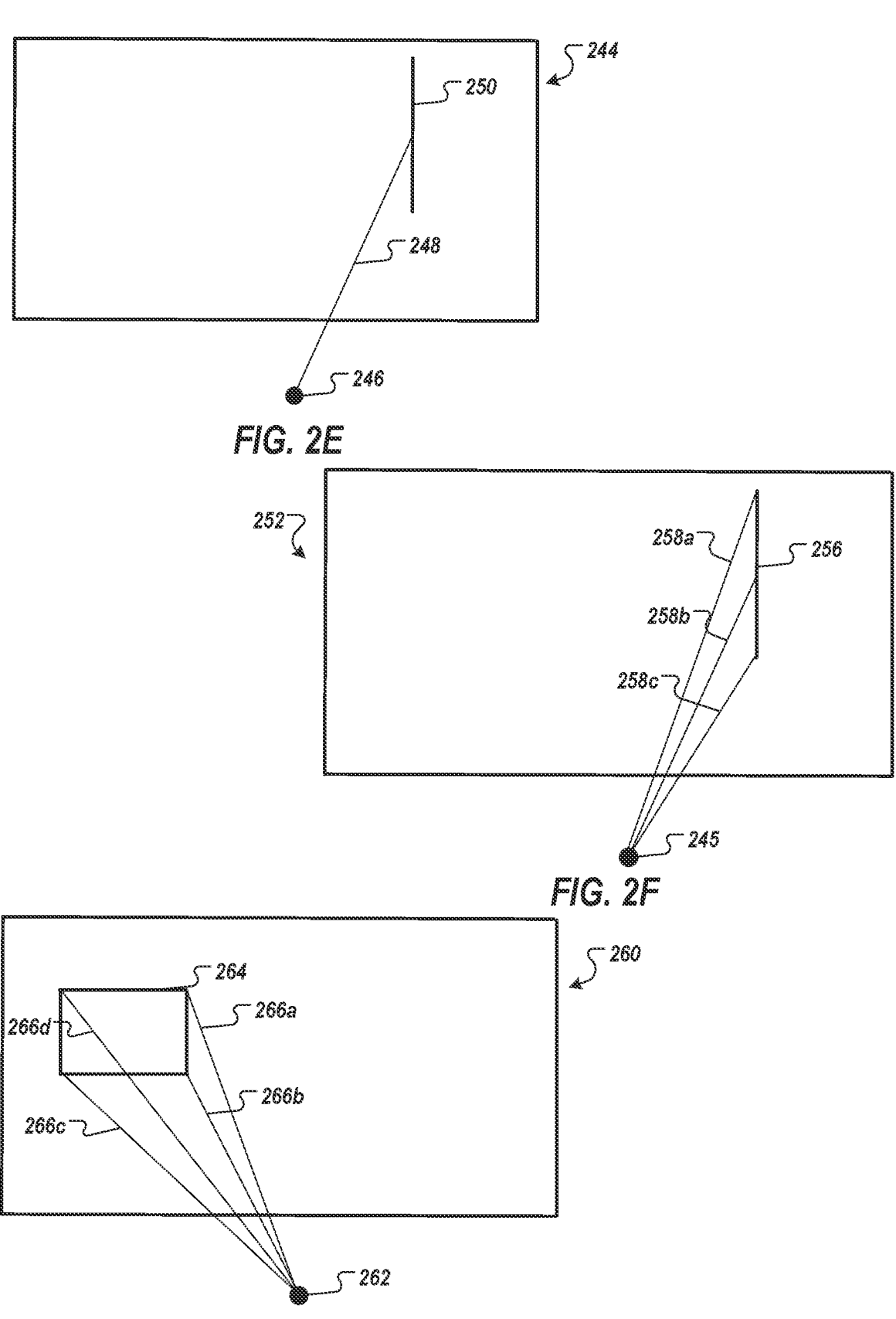
FIG. 2E-2G illustrate example diagrams respectively representing an image and one or more predicted image locations corresponding to a vanishing point, in accordance with one or more embodiments of the present disclosure.

Example implementations of determining one or more points of interest corresponding to a particular object in an image may be described and/or illustrated with respect to FIGS. 2E, 2F, and/or 2G. FIG. 2E illustrates an example diagram representing an image 244 and one or more predicted image locations 248 corresponding to a vanishing point 246 and a single point of interest associated with the object 250.

FIG. 2F illustrates an example diagram representing an image 252 and one or more predicted image locations 258 corresponding to a vanishing point 254 and one or more points of interest corresponding to the object 256 and the one or more predicted image locations 258. In some embodiments, a first point of interest corresponding to the object 256 may correspond to one or more first predicted image locations 258a, a second point of interest corresponding to the object 256 may correspond to one or more second predicted image locations 258b, and/or a third point of interest corresponding to the object 256 may correspond to one or more third predicted image locations 258c. In some embodiments, the object 256 may be the same as the object 250 in FIG. 2E. In some embodiments, it may be determined on one or more heuristic analyses whether using multiple points of interest corresponding to an object 250 and/or the object 256 may be more effective in performing one or more localization determinations. In particular, whether a single point of interest or multiple points of interest may assist in one or more cost analyses or comparisons between the one or more predicted image locations and one or more locations corresponding to the same object in 2D map data corresponding to a 2D map. In these or other embodiments, the one or more cost analyses and/or comparisons may be described and/or illustrated further in the present disclosure, such as, for example, with respect to FIG. 1A, 2A, or 3.

FIG. 2G illustrates an example diagram representing an image 260 and one or more predicted image locations 266 corresponding to a vanishing point 262 and one or more points of interest corresponding to an object 264. In FIG. 2G, the object 264 may include a back portion of a large truck, a road sign, or some other rectangular object 264.

In some embodiments, four points of interest may be determined. A first point of interest that corresponds to one or more first predicted image locations 266a, a second point of interest that corresponds to one or more second predicted image locations 266b, a third point of interest that corresponds to one or more third predicted image locations 266c, and a fourth point of interest that corresponds to one or more fourth predicted image locations 266d. In some embodiments, individual corners corresponding to the object 264 may correspond to respective points of interest associated with the object 264.

In some embodiments, one or more heuristic analyses may be performed to determine effective placement and/or determinations of the points of interest corresponding to objects represented in one or more images. In these or other embodiments, the heuristic analyses may be the same as, and/or analogous to, the heuristic analyses described further in the present disclosure, such as, for example, with respect to the object 256 and/or the object 250 described and/or illustrated, for example, with respect to FIGS. 2E and 2F.

Modifications, additions, or omissions may be made to FIGS. 2E, 2F, and/or 2G without departing from the scope of the present disclosure. For example, the environment captured by the image 244, the image 252, and/or the image 260, the location of the vanishing point 246, the vanishing point 254, and/or the vanishing point 262, the number of objects, etc. may vary. The specifics given and discussed are to help provide explanation and understanding of concepts of the present disclosure and are not meant to be limiting.

Returning to the description of FIG. 2A, the DNN(s) 202 may be configured to generate output data 210 based at least on the image data 206. In some embodiments, the output data 210 may include data corresponding to one or more images corresponding to the image data 206 and/or one or more identified objects corresponding to the one or more images. Additionally or alternatively, the output data 210 may include projected vanishing points, points of interest corresponding to the one or more objects, and/or one or more predicted image locations.

In some embodiments, the output data 210 may undergo one or more post processing operations. In some embodiments, the one or more post-processing operations may include temporal filtering, weighting, outlier removal (e.g., removing pixels or points determined to be outliers), upscaling (e.g., the outputs may be predicted at a lower resolution than an input sensor data instance, and the output may be upscaled back to the input resolution), downscaling, curve fitting, and/or other post-processing techniques. The outputs 204—after post-processing, in embodiments—may be in a 2D coordinate space (e.g., image space).

In some embodiments, the output data 210 may be transmitted, sent, or otherwise communicated to the comparison module 216. Additionally or alternatively, in some embodiments, the comparison module 216 may be configured to receive and/or otherwise obtain the 2D map data 208.

In some embodiments, the 2D map data 208 may include map data corresponding to a 2D map of an environment in which a machine and/or image sensor associated with the localization system 204 may be located. In some embodiments, the 2D map data 208 may additionally include data corresponding to a pose of the machine and/or image sensor. In these or other embodiments, the 2D map data 208 may be the same as and/or an example of the 2D map data 108 described and/or illustrated further in the present disclosure, such as, for example, with respect to FIG. 1A.

In some embodiments, the comparison module 216 may be configured to compare a 2D visual representation of the map corresponding to the map data 208 to the one or more predicted image locations in the image space. For example, the 2D map corresponding to the 2D map data 208 may be projected or otherwise overlayed in the image space corresponding to the image data 206. In some embodiments, projecting poses corresponding to the one or more objects in the 2D map may result in determining locations corresponding to the one or more objects in a portion of the image representing the ground in the real-world environment.

In some embodiments, the comparison module 216 may be configured to determine and/or generate cost data that may indicate a cost or an error. In some embodiments, the cost or error may be determined based on a difference between the 2D visual representation of the object and the one or more predicted image locations corresponding to the same object in an image space corresponding to the image.

In some embodiments, the comparison between the one or more predicted image locations in the image space and the 2D map data 208 corresponding to the 2D map may be made using one or more distance transforms. For example, a difference between the one or more predicted image locations and the 2D map data 208 corresponding to the map may be performed using one or more distance transform functions. In some embodiments, the distance transform functions may include one or more of a Euclidean distance transform, Manhattan distance transform, Chamfer distance transform, and/or other distance transform operations and/or functions that may be configured to determine a difference between the projected 2D map data 208 corresponding to the 2D map and the one or more predicted image locations corresponding to one or more locations of interest associated with the object.

In some embodiments, the comparison module 216 may be configured to generate cost data 218 based on the comparison between predicted image locations and 2D map data 208 projected into the image space. In some embodiments, a high cost may indicate a significant difference, or a difference that may satisfy a threshold, between the predicted image locations and the 2D map data 208 projected into the image space. Additionally or alternatively, a low cost, or no cost, may indicate an insignificant distance, or distance satisfying a threshold between the predicted image locations and the projected 2D map data 208.

In some embodiments, by comparing the one or more predicted image locations to the 2D map data 208, it may be determined whether, and/or to what extent, the estimated pose corresponding to the system and/or the image sensor used to collect and/or generate the image data 206 may be incorrect. For example, in some instances, the comparison between the one or more predicted image locations and the 2D map data 208 corresponding to the 2D map projected into the image space may yield a high cost or error which may indicate a significant difference in the one or more predicted image locations and the 2D map data 208.

In some embodiments, based on the comparison, it may be determined whether the estimated pose data corresponding to the system and/or the image sensor in the 2D map data may indicate that the system is too close, too far away, to one side or the other of the one or more objects in the image space.

An example implementation of comparing one or more predicted image locations and 2D map data corresponding to a map may be described and/or illustrated with respect to FIG. 3, FIG. 3 illustrates an example diagram representing a cost comparison between one or more predicted image locations 322 and one or more sets of projected 2D map data corresponding to respective points of interest associated with an object 312, in accordance with one or more embodiments of the present disclosure.

In some embodiments, the object 312 may be a representation of an object in the real-world environment, represented in the image space. In these or other embodiments, the object 312 may be the same as and/or analogous to the object 112 and/or the object 212 described further in the present disclosure, such as, for example, with respect to FIGS. 1B and/or 2B.

In some embodiments, the image 300 may include an origin 314. The origin may be a reference point for other locations in the image space corresponding to the image 300. In these or other embodiments, the origin 314 may be the same as and/or analogous to, the origin 214 and/or the origin 114 described and/or illustrated further in the present disclosure, such as, with respect to FIGS. 1B and 2B.

In some embodiments, the one or more predicted image locations 322 may correspond to respective sides of the object 312. For example, the first side 312a may correspond to one or more first predicted image locations 322a and the second side 312b may correspond to one or more second predicted image locations 322b. In some embodiments, the one or more predicted image locations 322 may be the same as and/or analogous to the predicted image locations 222 described and/or illustrated further in the present disclosure, such as, for example, with respect to FIG. 2B.

In some embodiments, the image 300 may include map data of one or more 2D locations corresponding to points of interest of the object 312 projected into the image space corresponding to the image 300. In some embodiments, the one or more 2D locations corresponding to the object 312 in the map data may be determined based on an estimated location corresponding to the machine and/or image sensor in the map data corresponding to the map.

In some embodiments, the number of projected 2D locations corresponding to the object 312 may be associated with the number of points of interest corresponding to the object 312. As illustrated in FIG. 3, for example, the one or more predicted image locations correspond to two points of interest, the first point of interest corresponding to the first side 312a of the object 312 and the second point of interest corresponding to the second side 312b of the object 312.

In some embodiments, a first set of projected 2D locations 324 may be compared to the one or more predicted image locations 322. In some embodiments, the comparison may determine that there is a difference—in some instances, a significant difference or a high cost—between the first set of projected 2D map locations 324 and the one or more predicted image locations 322. In some embodiments, in response to the comparison indicating that the first set of projected 2D map locations are closer together than the one or more predicted image locations 322, it may be determined that the estimated pose corresponding to the system and/or the image sensor may be longitudinally misaligned. For instance, it may be determined that the estimated pose of the machine and/or image sensor is too close or too far from the object 312 in the 2D map data (e.g., the 2D map data 208).

In another instance, a second set of projected 2D map locations 326 may be compared to the one or more predicted image locations 322. In some embodiments, the comparison may determine that there is no difference or a low cost between the second set of projected 2D map locations 326 and the one or more predicted image locations 322. In some embodiments, the estimated pose of the machine and/or image sensor in the 2D map data is correct as compared to the image 300.

In another example instance, a third set of projected 2D map locations 328 may be compared to the one or more predicted image locations 322. In some embodiments, the comparison may determine that there is a difference—in some instances, a significant difference or a high cost—between the third set of projected 2D map locations 328 and the one or more predicted image locations 322. In some embodiments, in response to the comparison indicating that the first set of projected 2D map locations are farther apart than the one or more predicted image locations 322, it may be determined that the estimated pose corresponding to the system and/or the image sensor may be longitudinally misaligned, much like the first set of projected 2D map locations 324. For example, longitudinal misalignment may indicate that the estimated pose of the machine and/or image sensor in the 2D map data is too close or too far from the object 312.

In some embodiments, a fourth set of projected 2D map locations 334 may be compared to the one or more predicted image locations 322. In some embodiments, the comparison may determine that there is a difference—in some instances, a significant difference or a high cost—between the fourth set of projected 2D map locations 334 and the one or more predicted image locations 322. In some embodiments, in response to the comparison indicating that the first set of projected 2D map locations are spaced correctly but aligned to the right of the one or more predicted image locations, it may be determined that the estimated pose corresponding to the system and/or the image sensor may be laterally misaligned. For example, lateral misalignment may indicate that the estimated pose of the machine and/or image sensor in the 2D map data is to the right or the left of the object.

Modifications, additions, or omissions may be made to FIG. 3 without departing from the scope of the present disclosure. For example, the placement of the origin 314, the environment captured by the image 300, the angle of an image sensor capturing the image 300, the number of objects 312 and/or the number of portions of the object 312, a number of projected2D map locations may vary. The specifics given and discussed are to help provide explanation and understanding of concepts of the present disclosure and are not meant to be limiting.

Returning to the description of FIG. 2A, the cost data 218 may be sent, transmitted, or otherwise communicated to the localization module 270. In some embodiments, the localization module 270 may be configured to determine one or more estimated locations corresponding to the object. In some embodiments, the localization module 270 may be configured to perform one or more operations using the cost data 218. In some embodiments, the estimated pose corresponding to the system and/or the camera associated with the system may be changed based on the determined cost. In some embodiments, the estimated pose may be adjusted iteratively until the cost satisfies a particular threshold. In some embodiments, the cost satisfying the particular threshold may indicate that the pose corresponding to the system and/or the camera associated with the system in the 2D map data may be correct relative to the object in the environment. In some embodiments, upon satisfying the particular threshold, the localization module 270 may be configured to generate localization data 272.

The localization data 272 may indicate one or more locations in the 2D map data where the system and/or the image sensor(s) corresponding to the system may be located. In some embodiments, the localization data 272 may be updated at one or more different time stamps and/or using one or more different images. In some embodiments, the localization data 272 may be communicated to one or more other systems, subsystems, etc. For example, the localization data 272 may be communicated to one or more control systems that may be configured to generate one or more control commands to direct one or more systems to perform operations, such as, for example, the operations described further in the present disclosure, such as, for example, with respect to FIG. 1A. In some embodiments, the localization data may be used by one or more computing systems and/or ego-machines to perform operations such as those described in further detail with respect to FIGS. 5A-5D, 6, and/or 7.

Modifications, additions, or omissions may be made to FIG. 2A without departing from the scope of the present disclosure. For example, the number of DNN(s) 202 and/or other modules may vary. Further, operations described herein may all be performed using one or more of the DNN(s) and/or modules in the localization system 204. The specifics given and discussed are to help provide explanation and understanding of concepts of the present disclosure and are not meant to be limiting.

FIG. 4 is a flow diagram showing a method 400 for localizing one or more systems, in accordance with one or more embodiments of the present disclosure. The method 400 may include one or more blocks 402, 404, 406, 408, and 410. Although illustrated with discrete blocks, the operations associated with one or more of the blocks of the method 400 may be divided into additional blocks, combined into fewer blocks, or eliminated, depending on the particular implementation.

In some embodiments, the method 400 may include block 402. At block 402, an image location corresponding to a portion of an object in an image may be determined. In some embodiments, the image location may be defined in a 2D image space. Additionally or alternatively, the 2D image space may be defined based on image data corresponding to the image. In some embodiments, the 2D image space may be generated using a camera. In some embodiments, the camera used to generate an image corresponding to the 2D image space may be a single, monocular camera.

At block 404, one or more predicted image locations may be determined. In some embodiments, the one or more predicted image locations may correspond to the image location of the representation of the portion of the object. Additionally or alternatively, in some embodiments, the one or more image locations may be determined based on a representation of the ground in the real-world environment, a vanishing point that may be projected in the image space, and the image location of the representation of the portion of the object.

In some embodiments, the vanishing point may be determined based on an orientation of the camera relative to a gravitational vector, where the gravitational vector may indicate a direction of gravity corresponding to the location projected into 2D image space. Further, in some embodiments, the vanishing point may additionally be determined using one or more characteristics of the camera. In some embodiments, the representation of the one or more predicted image locations may include a line segment that may include at least the image location of the representation of the portion of the object in the image corresponding to the environment and the vanishing point projected in the image space.

At block 406, one or more ground plane locations of the portion of the object may be compared with the one or more predicted image locations. In some embodiments, the one or more ground plane locations may be determined using a 2D map of the environment that may be projected into the 2D image space. In some embodiments, the one or more ground plane locations may be projected into the 2D image space using a pinhole projection model.

At block 408, a cost may be determined based on the comparison between the one or more ground plane locations and the one or more predicted image locations. In some embodiments, based on the determined cost, the one or more ground plane locations of the portion of the object may be iteratively updated until the determined cost satisfies a cost threshold.

At block 410, a system may be localized to the 2D map data based on the determined cost.

Modifications, additions, or omissions may be made to the method 400 and/or one or more operations included in the method 400 without departing from the scope of the present disclosure. For example, the operations corresponding to the method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Example Autonomous Vehicle

Figure 5A:
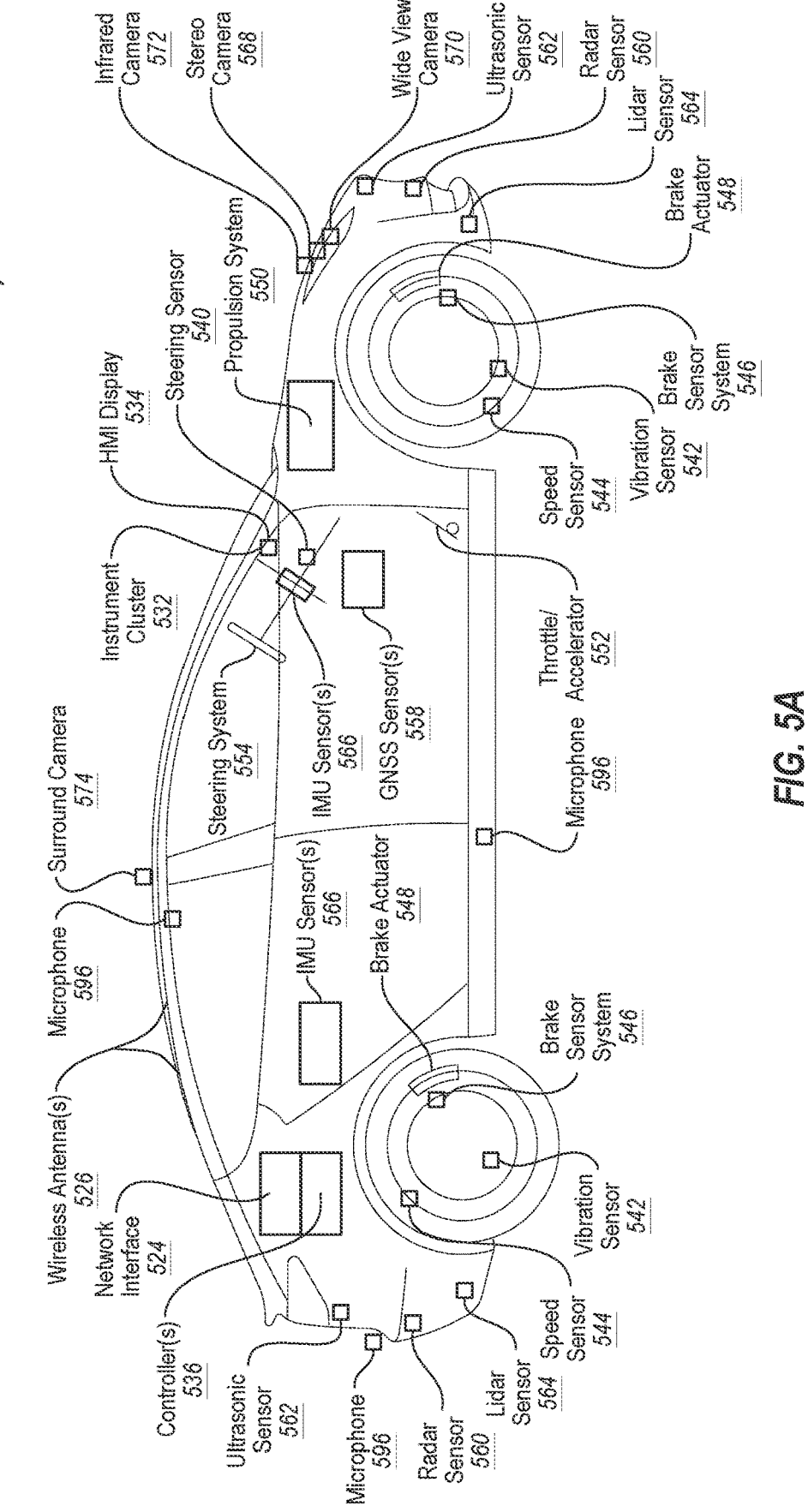
FIG. 5A is an illustration of an example autonomous vehicle, in accordance with one or more embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine, such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more CPU(s), system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, and/or to operate the propulsion system 550 via one or more throttle/accelerators 552. The controller(s) 536 may include one or more onboard (e.g., integrated) computing devices (e.g., supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer(s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g., for measuring the speed of the vehicle 500), vibration sensor(s) 542, steering sensor(s) 540, brake sensor(s) 546 (e.g., as part of the brake sensor system 546), and/or other sensor types.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the HD map 522 of FIG. 5C), location data (e.g., the location of the vehicle 500, such as on a map), direction, location of other vehicles (e.g., an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524, which may use one or more wireless antenna(s) 526 and/or modem(s) to communicate over one or more networks. For example, the network interface 524 may be capable of communication over LTE, WCDMA, UMTS, GSM, CDMA2000, etc. The wireless antenna(s) 526 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 5B:
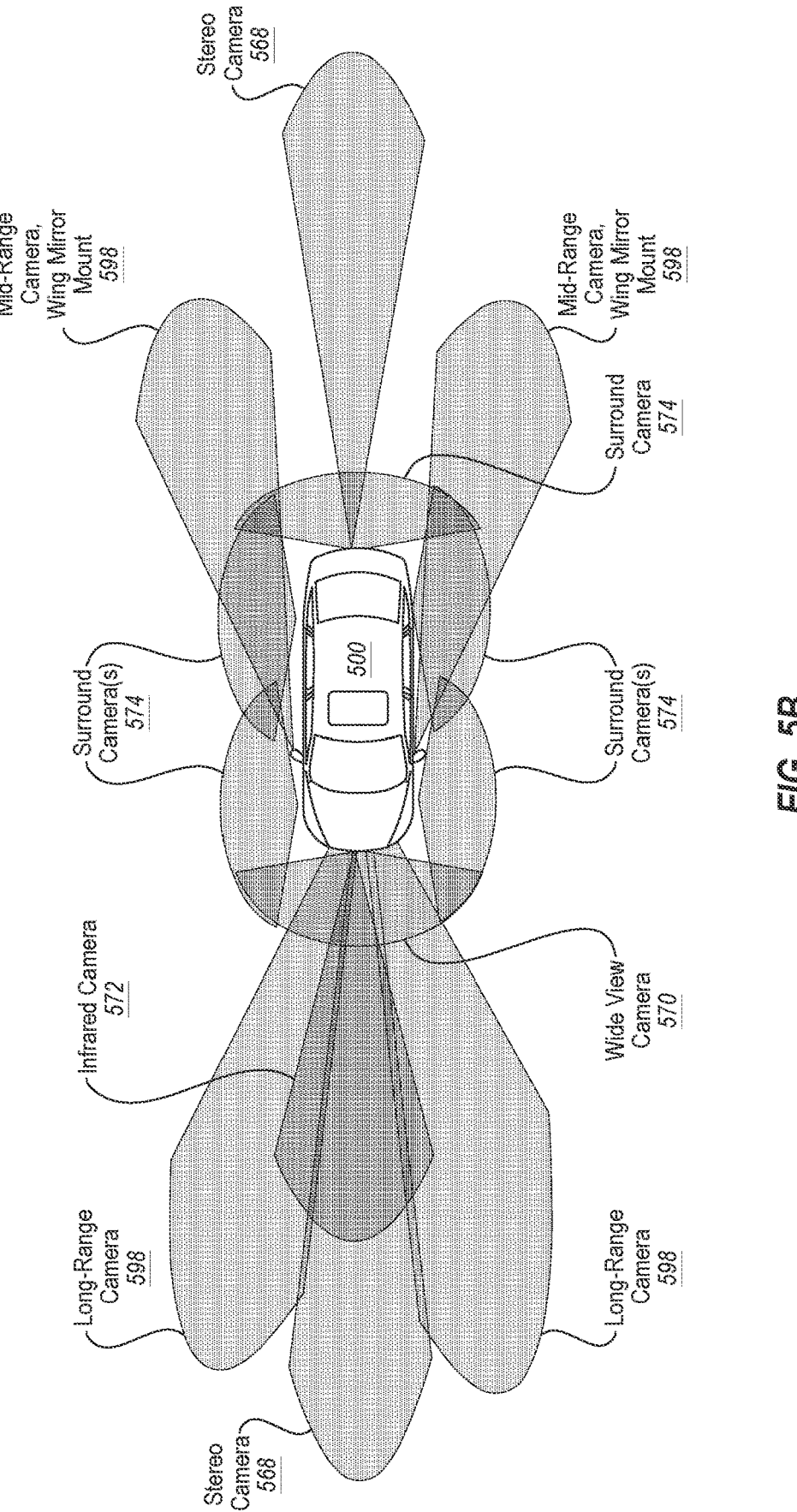
FIG. 5B is an example of camera locations and fields of view for the example autonomous vehicle of FIG. 5A, in accordance with one or more embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom-designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward-facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may any number of wide-view cameras 570 on the vehicle 500. In addition, long-range camera(s) 598 (e.g., a long-view stereo camera pair) may be used for depth-based object detection, especially for objects for which a neural network has not yet been trained. The long-range camera(s) 598 may also be used for object detection and classification, as well as basic object tracking.

One or more stereo cameras 568 may also be included in a front-facing configuration. The stereo camera(s) 568 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g., four surround cameras 574 as illustrated in FIG. 5B) may be positioned to on the vehicle 500. The surround camera(s) 574 may include wide-view camera(s) 570, fisheye camera(s), 360-degree camera(s), and/or the like. For example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround-view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
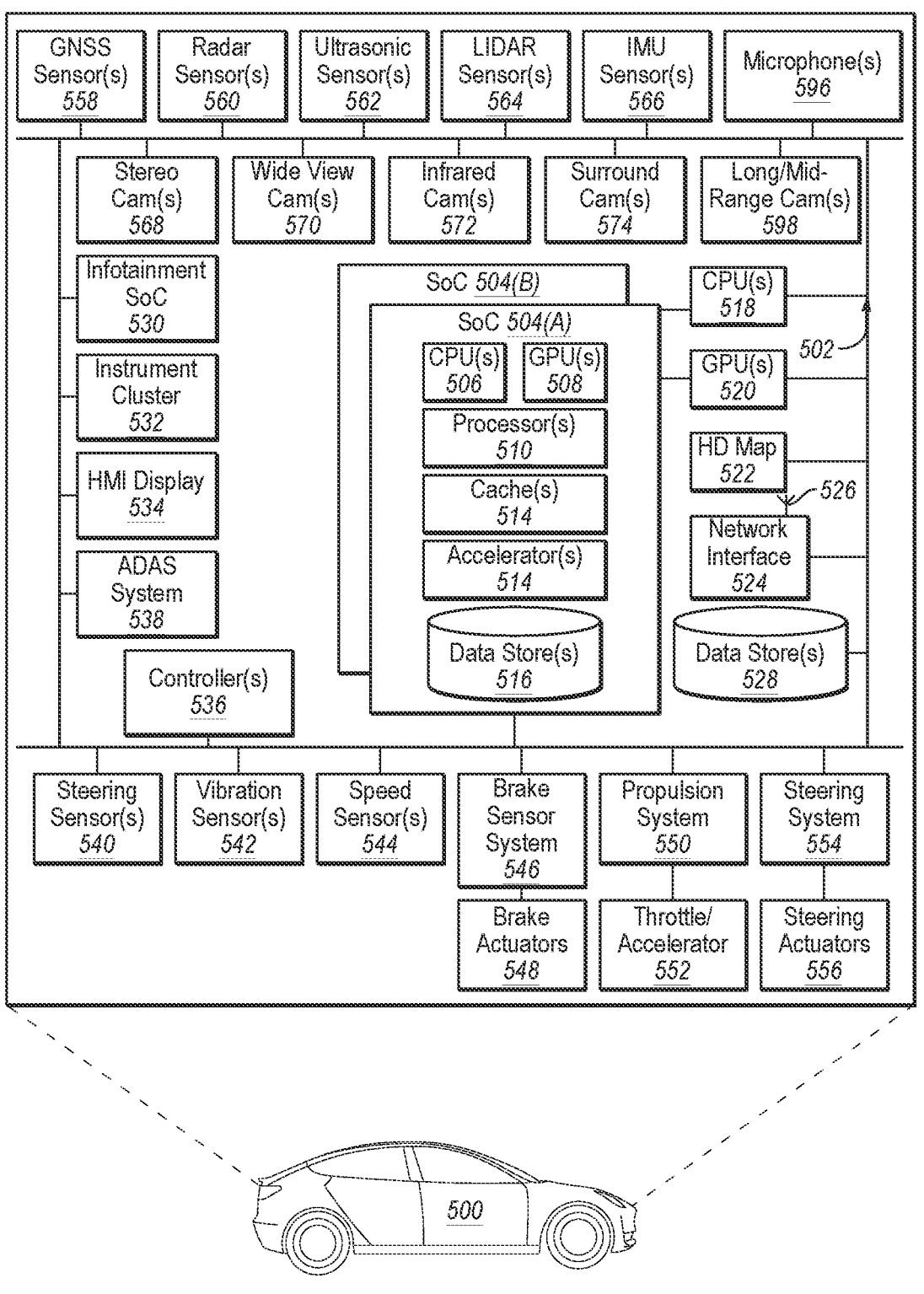
FIG. 5C is a block diagram of an example system architecture for the example autonomous vehicle of FIG. 5A, in accordance with one or more embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 500 in FIG. 5C is illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control. In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. 5A. The controller(s) 536 may be used for a variety of functions. The controller(s) 536 may be coupled to any of the various other components and systems of the vehicle 500 and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set. The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 508 may include at least eight streaming microprocessors. The GPU(s) 508 may use compute application programming interface(s) (API(s)). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting, and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread-scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected to both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to processed RADAR. In other examples, the PVA is used for time of flight depth processing, by processing raw time of flight data to provide processed time of flight data, for example.

The DLA may be used to run any type of network to enhance control and driving safety, including, for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g., LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 516 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services. The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe-stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always-on processor engine that may provide necessary hardware features to support low power sensor management and wake use cases. The always-on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. An in-cabin monitoring camera sensor is preferably monitored by a neural network running on another instance of the Advanced SoC, configured to identify in-cabin events and respond accordingly. In-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g., connected over Gigabit Multimedia Serial Link and Ethernet), sensors (e.g., LIDAR sensor(s) 564, RADAR sensor(s) 560, etc. that may be connected over Ethernet), data from bus 502 (e.g., speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path-planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path-planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always-on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g., NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528, which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPD (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions. RADAR functional safety levels may be ASIL B. The RADAR sensor(s) 560 may use the CAN and/or the bus 502 (e.g., to transmit data generated by the RADAR sensor(s) 560) for control and to access object tracking data, with access to Ethernet to access raw data, in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long-range with narrow field of view, short-range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surrounding at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 160 m (front) or 80 m (rear), and a field of view of up to 42 degrees (front) or 150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 100 m, with an accuracy of 2 cm-3 cm, and with support for a 100 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or corners of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor(s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high-performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and require-ments for the vehicle 500, and any combination of camera types may be used to provide the necessary coverage around the vehicle 500. In addition, the number of cameras may differ depending on the embodiment. For example, the vehicle may include six cameras, seven cameras, ten cam-eras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road sur-faces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longi-tudinal ACC monitors and controls the distance to the vehicle immediately ahead of the vehicle 500 and automati-cally adjust the vehicle speed to maintain a safe distance from vehicles ahead. Lateral ACC performs distance keep-ing, and advises the vehicle 500 to change lanes when necessary. Lateral ACC is related to other ADAS applica-tions such as LCA and CWS.

CACC uses information from other vehicles that may be received via the network interface 524 and/or the wireless antenna(s) 526 from other vehicles via a wireless link, or indirectly, over a network connection (e.g., over the Inter-net). Direct links may be provided by a vehicle-to-vehicle (V2V) communication link, while indirect links may be infrastructure-to-vehicle (I2V) communication link. In gen-eral, the V2V communication concept provides information about the immediately preceding vehicles (e.g., vehicles immediately ahead of and in the same lane as the vehicle 500), while the I2V communication concept provides infor-mation about traffic further ahead. CACC systems may include either or both I2V and V2V information sources. Given the information of the vehicles ahead of the vehicle 500, CACC may be more reliable, and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane. BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s).

RCTW systems may provide visual, audible, and/or tac-tile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results, which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for pro-viding perception information to a backup computer ratio-nality module. The backup computer rationality monitor may run a redundant diverse software on hardware compo-nents to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network that is trained and thus reduces the risk of false positives, as described herein.

The vehicle 500 may further include the infotainment SoC 530 (e.g., an in-vehicle infotainment system (IVI)). Although illustrated and described as an SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle-related information such as fuel level, total distance covered, brake fuel level, oil level, door open/close, air filter information, etc.) to the vehicle 500. For example, the infotainment SoC 530 may include radios, disk players, navigation systems, video players, USB and Bluetooth connectivity, carputers, in-car entertainment, Wi-Fi, steering wheel audio controls, hands-free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality. The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe-stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
FIG. 5D is a system diagram for communication between cloud-based server(s) and the example autonomous vehicle of FIG. 5A, in accordance with one or more embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580). The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 6:
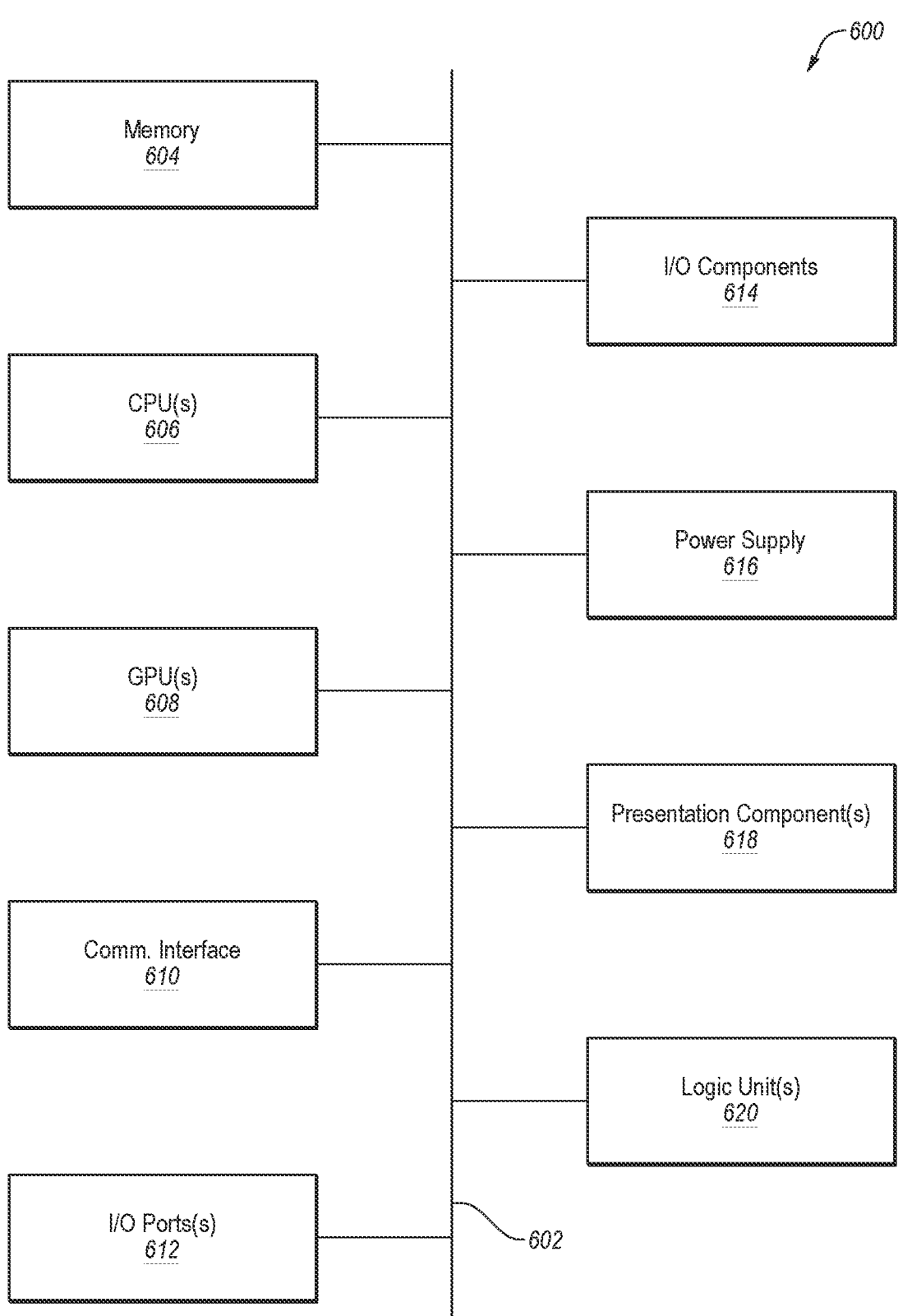
FIG. 6 is a block diagram of an example computing device suitable for use in implementing one or more embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point, connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMS), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, include wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail in the present disclosure) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-716(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described in the present disclosure with respect to the data center 700. In at least one embodiment, trained or deployed machine learning models corresponding to one or more neural networks may be used to infer or predict information using resources described in the present disclosure with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described in the present disclosure may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to codes that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B. Additionally, use of the term "based on" should not be interpreted as "only based on" or "based only on." Rather, a first element being "based on" a second element includes instances in which the first element is based on the second element but may also be based on one or more additional elements.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   determining an image location of a representation of a portion of an object in an image corresponding to an environment, the image location being defined in two-dimensional (2D) image space based at least on image data corresponding to the image;
   determining one or more predicted image locations corresponding to the image location of the representation of the portion of the object
   comparing one or more ground plane locations corresponding to the portion of the object with the one or more predicted image locations, the one or more ground plane locations determined using 2D map data corresponding to a 2D map of the environment projected into the 2D image space;

updating the one or more ground plane locations until a cost determined based at least on the comparing satisfies a cost threshold;
   localizing a machine to the 2D map data based at least on the cost; and
   performing, by the machine, one or more autonomous operations based at least on the localizing to the 2D map data.

2. The method of claim 1, wherein the one or more predicted image locations are determined based at least on a vanishing point projected in the image space and the vanishing point is determined based at least on an orientation of a camera, used to generate the image data, relative to a gravitational vector, the gravitational vector indicating a direction of gravity projected into the 2D image space.

3. The method of claim 1, wherein the one or more predicted image locations are determined based at least on a vanishing point projected in the image space and the vanishing point is further determined using one or more characteristics of a camera used to generate the image data.

4. The method of claim 1, wherein a representation of the one or more predicted image locations includes a line segment including at least the image location of the representation of the portion of the object in the image corresponding to the environment.

5. The method of claim 1, wherein the image data is generated using a single, monocular camera.

6. The method of claim 1, wherein the one or more ground plane locations determined using the 2D map of the environment projected into the 2D image space are projected using a pinhole projection model.

7. A method comprising:
   determining one or more predicted image locations corresponding to an image location, in a 2D image space associated with an image, of a portion of an object;
   updating one or more ground plane locations corresponding to the portion of the object until a difference between the one or more predicted image locations and the one or more ground plane locations satisfies an error threshold, the one or more ground plane locations corresponding to one or more positions of the portion of the object in a 2D map of an environment projected into the 2D image space;
   localizing a machine to the 2D map based at least on the difference satisfying the error threshold; and
   performing, by the machine, one or more autonomous operations based at least on the localizing to the 2D map data.

8. The method of claim 7, wherein the one or more predicted image locations is determined based at least on:
   a representation of the ground in the image space;
   a vanishing point projected into the 2D image space; and
   the image location of the representation of the portion of the object.

9. The method of claim 8, wherein the vanishing point is determined based at least on an orientation of a camera, used to capture the image, relative to a gravitational vector, the gravitational vector indicating a direction of gravity projected into the 2D image space.

10. The method of claim 9, wherein the vanishing point is further determined using one or more characteristics of the camera.

11. The method of claim 8, wherein a representation of the one or more predicted image locations includes a line segment including at least the image location of the representation of the portion of the object in the image corresponding to the environment and the vanishing point projected in the image space.

12. The method of claim 7, wherein the image is captured using a single, monocular camera.

13. The method of claim 7, wherein the one or more ground plane locations determined using the 2D map of the environment projected into the 2D image space are projected using a pinhole projection model.

14. One or more processors comprising processing circuitry to perform operations comprising:

determining one or more predicted image locations corresponding to an image location, in a 2D image space associated with an image, of a portion of an object, the one or more predicted image locations determined based at least on a vanishing point projected into the 2D image space and determined based at least on one or more characteristics of a camera used to capture the image;

comparing one or more ground plane locations corresponding to the portion of the object with the one or more predicted image locations, the one or more ground plane locations determined using a 2D map of an environment projected into the 2D image space;

localizing a machine to the 2D map based at least on the comparing; and causing the machine to perform one or more autonomous operations based at least on the localizing to the 2D map data.

15. The one or more processors of claim 14, wherein the one or more predicted image locations are determined further based at least on:

a representation of the ground in a real-world environment;

and the image location of the representation of the portion of the object.

16. The one or more processors of claim 15, wherein the one or more characteristics of the camera include an orientation of the camera relative to a gravitational vector, the gravitational vector indicating a direction of gravity projected into the 2D image space.

17. The one or more processors of claim 14, wherein the processor is included in a system, the system is comprised in at least one of:

a control system for an autonomous or semi-autonomous machine;

a perception system for an autonomous or semi-autonomous machine; a system for performing simulation operations;

a system for performing digital twin operations;

a system for performing light transport simulation;

a system for performing collaborative content creation for 3D assets; a system for performing deep learning operations;

a system for presenting at least one of augmented reality content, virtual reality content, or mixed reality content;

a system for hosting one or more real-time streaming applications; a system implemented using an edge device;

a system implemented using a robot;

a system for performing conversational AI operations;

a system implementing one or more large language models (LLMs); a system for performing generative AI operations;

a system for generating synthetic data;

a system incorporating one or more virtual machines (VMs); a system implemented at least partially in a data center; or a system implemented at least partially using cloud computing resources.

* * * * *